United States Patent
Salvino et al.

(10) Patent No.: US 12,100,580 B1
(45) Date of Patent: Sep. 24, 2024

(54) LOCATING MINING SITES USING AN OPEN MASS SPECTROMETER

(71) Applicants: Chris Salvino, Scottsdale, AZ (US); Andrew Dummer, Chapel Hill, NC (US)

(72) Inventors: Chris Salvino, Scottsdale, AZ (US); Andrew Dummer, Chapel Hill, NC (US)

(73) Assignee: LUNAR HELIUM-3 MINING, LLC, Scottsdale, AZ (US)

( * ) Notice: Subject to any disclaimer, the term of this patent is extended or adjusted under 35 U.S.C. 154(b) by 0 days.

(21) Appl. No.: 18/406,459

(22) Filed: Jan. 8, 2024

Related U.S. Application Data

(63) Continuation-in-part of application No. 18/538,102, filed on Dec. 13, 2023, now Pat. No. 12,044,636.

(51) Int. Cl.
  *H01J 49/04* (2006.01)
  *H01J 49/00* (2006.01)
  *H01J 49/20* (2006.01)

(52) U.S. Cl.
  CPC ...... *H01J 49/0022* (2013.01); *H01J 49/0086* (2013.01); *H01J 49/0422* (2013.01); *H01J 49/049* (2013.01); *H01J 49/20* (2013.01)

(58) Field of Classification Search
  CPC .... H01J 49/0022; H01J 49/0086; H01J 49/02; H01J 49/0422; H01J 49/049; H01J 49/20
  See application file for complete search history.

(56) References Cited

U.S. PATENT DOCUMENTS

| | | | | |
|---|---|---|---|---|
| 4,593,530 | A * | 6/1986 | Longsworth | H01J 49/24 73/40.7 |
| 4,791,291 | A * | 12/1988 | Tou | H01J 49/0431 250/281 |
| 5,168,158 | A | 12/1992 | McComas et al. | |
| 5,313,061 | A * | 5/1994 | Drew | H01J 49/26 250/296 |
| 7,132,650 | B1 * | 11/2006 | Gamble | H01J 49/0431 250/288 |
| 7,405,409 | B2 * | 7/2008 | Kearfott | G01V 5/222 250/390.04 |
| 7,514,694 | B2 | 4/2009 | Stephan et al. | |
| 7,919,758 | B2 | 4/2011 | Stephan et al. | |
| 8,067,742 | B2 * | 11/2011 | Winso | G01V 5/26 250/367 |
| 8,159,357 | B1 * | 4/2012 | Jarvinen | G01V 9/02 340/580 |
| 8,261,594 | B2 * | 9/2012 | Maehira | G01M 3/205 73/49.3 |
| 8,330,115 | B2 | 12/2012 | Frank | |
| 9,632,188 | B2 * | 4/2017 | Chandrasekharan | G01T 3/001 |
| 10,005,033 | B2 * | 6/2018 | McMurtry | G01N 33/0036 |
| 10,978,285 | B2 * | 4/2021 | Inoue | H01J 49/0027 |

(Continued)

*Primary Examiner* — Allen C. Ho
(74) *Attorney, Agent, or Firm* — Kenneth Altshuler

(57) ABSTRACT

Disclosed is a He-3 detector arrangement that generally comprises a mass spectrometer that has an intake funnel configured to receive (sniff out) He-3 through an intake port directly from an open environment. The intake funnel is configured to direct the He-3 into the mass spectrometer. The arrangement further comprises a heating element configured to liberate the He-3 from regolith via heat. A mobile carrier is configured to position the intake port the regolith to obtain samples of the He-3.

17 Claims, 17 Drawing Sheets

(56) References Cited

U.S. PATENT DOCUMENTS

| | | | |
|---|---|---|---|
| 10,985,004 B2 * | 4/2021 | Kudo | H01J 49/40 |
| 11,621,153 B2 * | 4/2023 | Javahery | H01J 49/16 250/288 |
| 11,852,761 B2 * | 12/2023 | Liang | G01V 5/02 |
| 11,892,419 B2 * | 2/2024 | Al-Shammari | G01V 5/02 |
| 12,044,636 B1 * | 7/2024 | Salvino | G01V 5/02 |
| 2013/0034198 A1 | 2/2013 | Chandrasekharan et al. | |
| 2023/0411134 A1 | 9/2023 | Ryan et al. | |

* cited by examiner

LOCATING MINING SITES USING AN OPEN MASS SPECTROMETER

CROSS-REFERENCE TO RELATED APPLICATIONS

This continuation-in-part application claims priority to and the benefit of U.S. Pat. No. 12,044,636 entitled: LOCATING MINING SITES USING NEUTRON DETECTION, filed on Dec. 13, 2023 with an issue date of Jul. 23, 2024, the entire disclosure of which is hereby incorporated by reference.

BACKGROUND OF THE INVENTION

3. Field of the Invention

The present invention relates generally to identifying mining sites using helium-3 detection techniques to map areas of high concentrations of He-3 to be mined.

4. Description of Related Art

Identifying the concentration of target materials, such as helium-3 (He-3), that are intended to be mined before diving into mining operations holds immense value. Having a general idea of target element concentration within a mining site enables a more efficient strategy of extraction methods effectively, minimizing unnecessary loss of time and expense. By conducting, at least, a cursory assessments of target material concentration, mining ventures can employ better targeted and efficient extraction techniques, reducing the need for extensive excavation and processing. This approach not only conserves precious resources used to mine the target materials but also mitigates the disruption to the general mining location.

Moreover, knowing the target material concentration beforehand significantly influences the economic viability of a mining project. Accurate assessments allow for informed decisions about whether to proceed with extraction, avoiding costly endeavors where the target material concentration might be too low to yield minimum returns. By identifying regions of high target material concentration, mining operations can more efficiently use their resource allocation, directing investments toward sites with higher concentrations, thereby maximizing the efficiency and profitability of their operations while minimizing lost time and unnecessary mining costs. Ultimately, the value of identifying target materials concentrations prior to mining lies in its ability to ensure a more efficient approach to target material extraction.

It is to innovations related to this subject matter that the embodiments of the invention are generally directed.

SUMMARY OF THE INVENTION

The present invention generally relates to an apparatus for mining and collecting He-3 as well as other target gaseous elements from extra-terrestrial bodies in a very low-pressure environment. A very low pressure is defined as below 7 millibars.

In that light, certain embodiments of the present invention envision a mass spectrometer arrangement that comprises a mass spectrometer carried around on a mobile carrier. The mass spectrometer comprises a base-particle pathway defined as beginning from an intake port and ending at a detector plate (the base-particle pathway traverses through the mass spectrometer). The mass spectrometer further comprises an intake funnel having a funnel shaped housing that extends from the intake port to an exit port, wherein the exit port is smaller than the intake port. The intake port is unobstructed from directly interfacing an open environment and is configured to be in communication with the open environment during operation. The mass spectrometer further comprises an ionizer adjacent to the exit port, wherein the mass spectrometer ionizer is configured to ionize base-particles (such as atoms or single molecules) in a portion of the base-particle pathway. The mass spectrometer further comprises a detector housing that comprises the detector plate and an angled housing having split-pole magnets that are configured to direct the base-particles at an angle $\beta+/-$an offset (depending on the mass of the base-particle), such as less than 10 degrees, along the base-particle pathway. The mass spectrometer arrangement, and in some embodiments, the intake funnel, has a granular surface disrupter configured to liberate the base-particles from a granular surface that is external to the mass spectrometer arrangement. The mass spectrometer arrangement further has a mobile carrier that supports or otherwise holds the mass spectrometer. The mobile carrier is configured to position the intake port over the exterior granular surface.

Another embodiment of the present invention envisions a mass spectrometer system comprising a mass spectrometer, a heating element, and a mobile carrier. The mass spectrometer can comprise a channel that extends through the mass spectrometer system 200 from an intake port to a detector. The mass spectrometer can further comprise an intake funnel comprising an intake port that is configured to receive base-particles directly from an open environment. The intake funnel is configured to direct the base particles to an exit port. The mass spectrometer can further comprise an ionizer that is configured to ionize the base-particles from the exit port. The mass spectrometer also comprises split-pole magnets disposed in an angled housing that is between the ionizer and the detector. A heating element, which can be in the mass spectrometer or elsewhere in the system, is configured to liberate the base-particles via heat from a granular surface that is external to the mass spectrometer system. The system envisions a mobile carrier that is configured to position the intake port in close proximity to the exterior granular surface.

A mass spectrometer arrangement is envisioned to comprise a mass spectrometer being positioned and supported by a mobile carrier. The mass spectrometer can have an intake funnel that is configured to receive base-particles through an intake port directly from an open environment. The intake funnel is configured to direct the base particle into the mass spectrometer. The arrangement can further comprise a heating element configured to liberate the base-particles from regolith via heat, the regolith is not part of the open environmental mass spectrometer arrangement. Some embodiments envision the mass spectrometer comprising the heating element. The arrangement further comprises a mobile carrier that is configured to position the intake port over the regolith (positioned within 12 inches of the surface of the regolith).

Certain other embodiments of the present invention envision a He-3 detection arrangement as shown in comprising a thermal neutron source and a thermal neutron detector. More specifically, the thermal neutron source can comprise a thermal neutron emitter encapsulated in a hydrogen rich material, wherein the thermal neutron source is configured to emit thermal neutrons in all directions. The thermal neutron detector can be configured to detect a concentration of the thermal neutrons. In the arrangement, a neutron shield is interposed between the thermal neutron source and the thermal neutron detector. The neutron shield is configured to block some of the thermal neutrons emitted from the thermal neutron source that are aimed at the thermal neutron detector (such as attenuating at least 90% of the neutrons that are between the shield and the thermal neutron detector). A power source, such as a battery or solar system, for example, is configured to provide power to the thermal neutron source and the thermal neutron detector. A metal plate has a periphery, which is the sidewall boundary of the metal plate shown by the four side. The thermal neutron source, the thermal neutron detector, and the neutron shield are disposed on the metal plate within the periphery.

Optionally, another embodiment of the present invention envisions a He-3 detection system comprising generally comprising a thermal neutron detector sensing a quantity of neutrons emitted from a thermal neutron source to evaluate a concentration of He-3 in regolith or some other granular soil. More specifically, the embodiment envisions the thermal neutron source configured to emit thermal neutrons in all directions wherein the thermal neutron detection system is configured to detect a neutron concentration of the thermal neutrons backscattered from granular soil. A neutron shield is interposed between the thermal neutron source and the thermal neutron detector to isolate the neutrons detected from the regolith thereby assessing a quantity or concentration of He-3 in the regolith. A power source, such as a battery, can be included with the system to provide power to the thermal neutron source and the thermal neutron detection system. The neutron shield, the thermal neutron source, and the thermal neutron detection system are envisioned to be disposed on a metal plate that is configured to be placed within 10 cm of a surface of the granular soil.

Yet another optional embodiment of the present invention envisions an arrangement that detects He-3 in regolith on the Moon. The arrangement can comprise a neutron source that is configured to emit thermal neutrons, a neutron detector that is configured to detect a neutron concentration of the neutrons that are backscattered from the regolith and a neutron shield that is interposed between the neutron source and the neutron detector. The neutron shield is configured to block at least some of the neutrons in a line-of-sight between the neutron source and the neutron detector. The arrangement can also include a power source that is configured to provide power to the thermal neutron source, the thermal neutron detection system, and a transmitter. The transmitter is configured to transmit the neutron concentration/s to a remote receive. The neutron shield, the thermal neutron source, and the thermal neutron detection system are envisioned to be disposed on a metal plate. The arrangement is further envisioned to be moved to different locations on the surface of the Moon via a transporter.

DETAILED DESCRIPTION

Figure 1A:
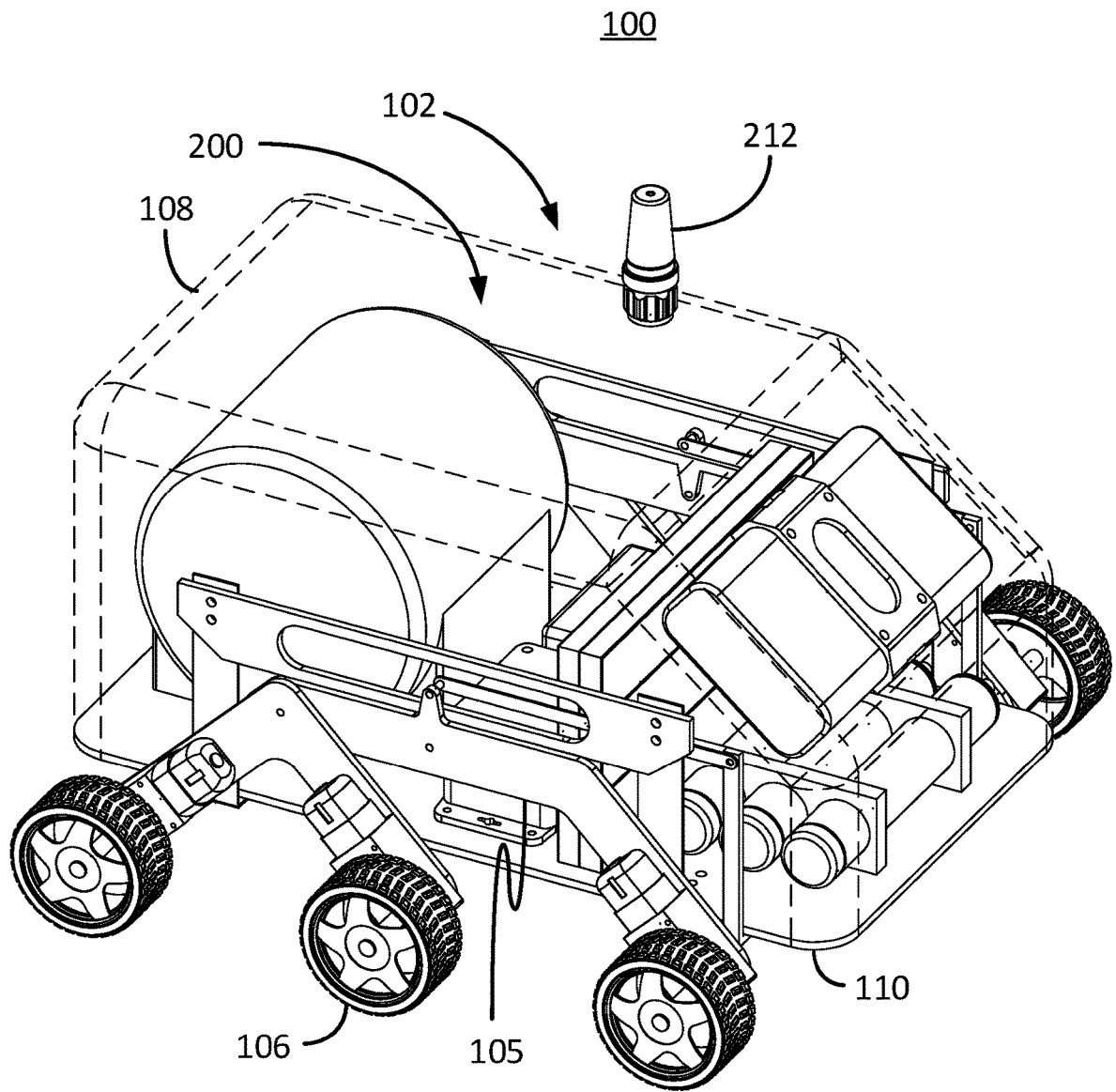
FIG. 1A is a line drawing of a transport and He-3 detector embodiment consistent with embodiments of the present invention.

Initially, this disclosure is by way of example only, not by limitation. Thus, although the instrumentalities described herein are for the convenience of explanation, shown and described with respect to exemplary embodiments, it will be appreciated that the principles herein may be applied equally in other similar configurations involving the subject matter directed to the field of the invention. The phrases "in one embodiment", "according to one embodiment", and the like, generally mean the particular feature, structure, or characteristic following the phrase, is included in at least one embodiment of the present invention and may be included in more than one embodiment of the present invention. Importantly, such phases do not necessarily refer to the same embodiment. If the specification states a component or feature "may", "can", "could", or "might" be included or have a characteristic, that particular component or feature is not required to be included or have the characteristic. As used herein, the terms "having", "have", "including" and "include" are considered open language and are synonymous with the term "comprising". Furthermore, as used herein, the term "essentially" is meant to stress that a characteristic of something is to be interpreted within acceptable tolerance margins known to those skilled in the art in keeping with typical normal world tolerance, which is analogous with "more or less." For example, essentially flat, essentially straight, essentially on time, etc. all indicate that these characteristics are not capable of being perfect within the sense of their limits. Accordingly, if there is no specific +/- value assigned to "essentially", then assume essentially means to be within +/-2.5% of exact. The term "connected to" as used herein is to be interpreted as a first element physically linked or attached to a second element and not as a "means for attaching" as in a "means plus function". In fact, unless a term expressly uses "means for" followed by the gerund form of a verb, that term shall not be interpreted under 35 U.S.C. § 112 (f). In what follows, similar or identical structures may be identified using identical call-outs.

With respect to the drawings, it is noted that the figures are not necessarily drawn to scale and are diagrammatic in nature to illustrate features of interest. Descriptive terminology such as, for example, upper/lower, top/bottom, horizontal/vertical, left/right and the like, may be adopted with respect to the various views or conventions provided in the figures as generally understood by an onlooker for purposes of enhancing the reader's understanding and is in no way intended to be limiting. All embodiments described herein are submitted to be operational irrespective of any overall physical orientation unless specifically described otherwise, such as elements that rely on gravity to operate, for example.

Described herein are embodiments directed to identification of target materials in an extremely low-pressure and low gravity environment. Extremely low-pressure environment is defined herein as below 7 millibars, wherein pressure at sea-level on Earth is approximately 1 bar. Low gravity is defined herein as at most 4 m/sec$^2$. Aspects of the present invention consider mining gaseous atoms and molecules on extraterrestrial bodies, such as the Moon, asteroids, moons orbiting other planets, Mars, etc. Many of these extraterrestrial bodies have little to no ambient pressure at or within several meters of their surfaces and depending on the size of the extraterrestrial body, they generally have a significantly lower gravitational pull than that experienced on Earth.

Though embodiments of the present invention can be used in conjunction with many different extraterrestrial bodies, it is one object of the present invention to focus on mining gaseous atoms and molecules (materials) from the Moon, with special focus on helium-3 (He-3). The Moon's atmosphere (the surface boundary exosphere) has a pressure of about $3 \times 10^{-15}$ bars and can range in temperature between 20° to 400° Kelvin. In the interest of continued exploration of the Moon as well as maintaining long-term residents on the Moon, extracting or otherwise mining important gaseous materials from the Moon, such as oxygen, nitrogen, hydrogen, and helium, for example, reduces the dependency of transporting such gaseous materials from the Earth. Moreover, He-3, a light stable isotope of helium having two protons and one neutron, which has promise as an important constituent in fusion reactions, is far more abundant on the Moon than on Earth. In some estimates, He-3 is more than a thousand times more abundant on the Moon than compared to the Earth making the Moon a better target to obtain He-3.

Certain embodiments of the present invention envision identifying target material concentrations on the surface or within several feet of the surface of the Moon by way of detecting backscattered neutron concentrations from moon regolith, or simply "regolith". Optional embodiments use an open environment mass spectrometer to sample concentrations of He-3 from moon regolith. In this way, target material (such as He-3) to be mined can be mapped in mining regions of interest to more efficiently mine the riches areas of the target material.

Accordingly, some embodiments of the present invention contemplate a He-3 detector arrangement that generally comprises a neutron shield that is interposed between a thermal neutron source and three thermal neutron detectors all resting on a metal platform. In operation, thermal neutrons from the thermal neutron source are emitted when the He-3 detector arrangement is either sitting directly on the ground (regolith) or just above it. Some of the thermal neutrons from the neutron source will backscatter from the regolith where they will be detected by the thermal neutron detection system and a baseline count level will be registered. When He-3 is present in the regolith, some of the thermal neutrons will be absorbed by the He-3 reducing the detected count rate. When integrated into a rover, the arrangement can be either moved from place to place with count rates at each location compared, or the rover might creep slowly along the surface. In this manner, higher and lower levels of He-3 in the regolith can be mapped.

Other embodiments of the present invention contemplate a He-3 detector arrangement that generally comprises a mass spectrometer that has an intake funnel configured to receive (sniff out) He-3 through an intake port directly from an open environment. The intake funnel is configured to direct the He-3 into the mass spectrometer. The arrangement further comprises a heating element configured to liberate the He-3 from regolith via heat. A mobile carrier is configured to position the intake port the regolith to obtain samples of the He-3.

Referring to the drawings, FIG. 1A is a line drawing of a transport and He-3 detector embodiment consistent with embodiments of the present invention. The transport and He-3 detector embodiment 100 generally comprises a He-3 detector 200 that is depicted as being supported or otherwise carried by a rover 102. The rover 102 comprises an ambulatory arrangement, which in this embodiment are wheels 106 that are mounted on a suspension system 105 but could just as easily be comprised of tracks, robotic legs, or some other kind of ambulation arrangement to carry the He-3 detector 200 to different sites on the surface 112A of the Moon 122. As shown, the He-3 detector 200 is resting atop a metal plate 110 and is essentially encapsulated by a cover 108. An antenna 212, which extends from cover 108, is connected to transmitter electronics and possibly a transceiver (not shown) housed in a transmitter 214. The antenna 212 facilitates at least one way communication, such as by RF, with a receiver that is located away from the rover 102. Other embodiments envision the He-3 detector 200 being integrated with a low gravity skipper 120, like that shown in FIG. 1B, wherein the low gravity skipper 120 jumps off the surface 112A of the Moon 122 and then back down on the surface 112A of the Moon 122 in a different location. The low gravity skipper 120 can use jet propulsion or a spring-loaded platform to skip off the surface 112A of the Moon 122. The spring-loaded platform avoids disrupting the surface 112A of the regolith 112.

Figure 1B:
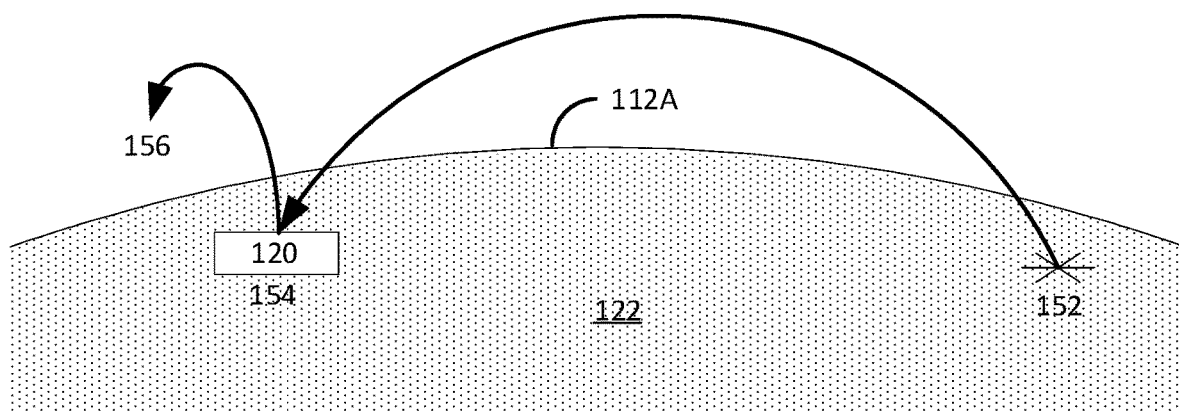
FIG. 1B is a schematic diagram of mapping a region on the Moon with the He-3 detector arrangement onboard a skipper transporter consistent with embodiments of the present invention.

FIG. 1B is a schematic diagram of mapping a region on the Moon 122 with the He-3 detector arrangement onboard a skipper transporter consistent with embodiments of the present invention. This embodiment contemplates a skipper 120 that is operable to launch from a first site 152, after evaluating the concentration of He-3 at the first site 152, land at a second site 154 and evaluate the concentration of He-3 at the second site 154 before launching to a third site 156 to evaluate the concentration of He-3 at the third site 156. In this way, a portion of the lunar surface 112A can be mapped out for He-3 concentrations to target the richest and most ideal locations to mine He-3. Because the gravity on the Moon 122 is about ⅙ the Earth's gravity, the energy required to launch (and land) the skipper 120 is significantly less. The skipper 120 can be a spring-loaded vehicle or pod and can be held level (maintain an upright orientation while skipping) with a gyroscope or jet packs. Optionally, the skipper 120 can be equipped with rockets to skip from location 154 to location 156.

Figure 2A:
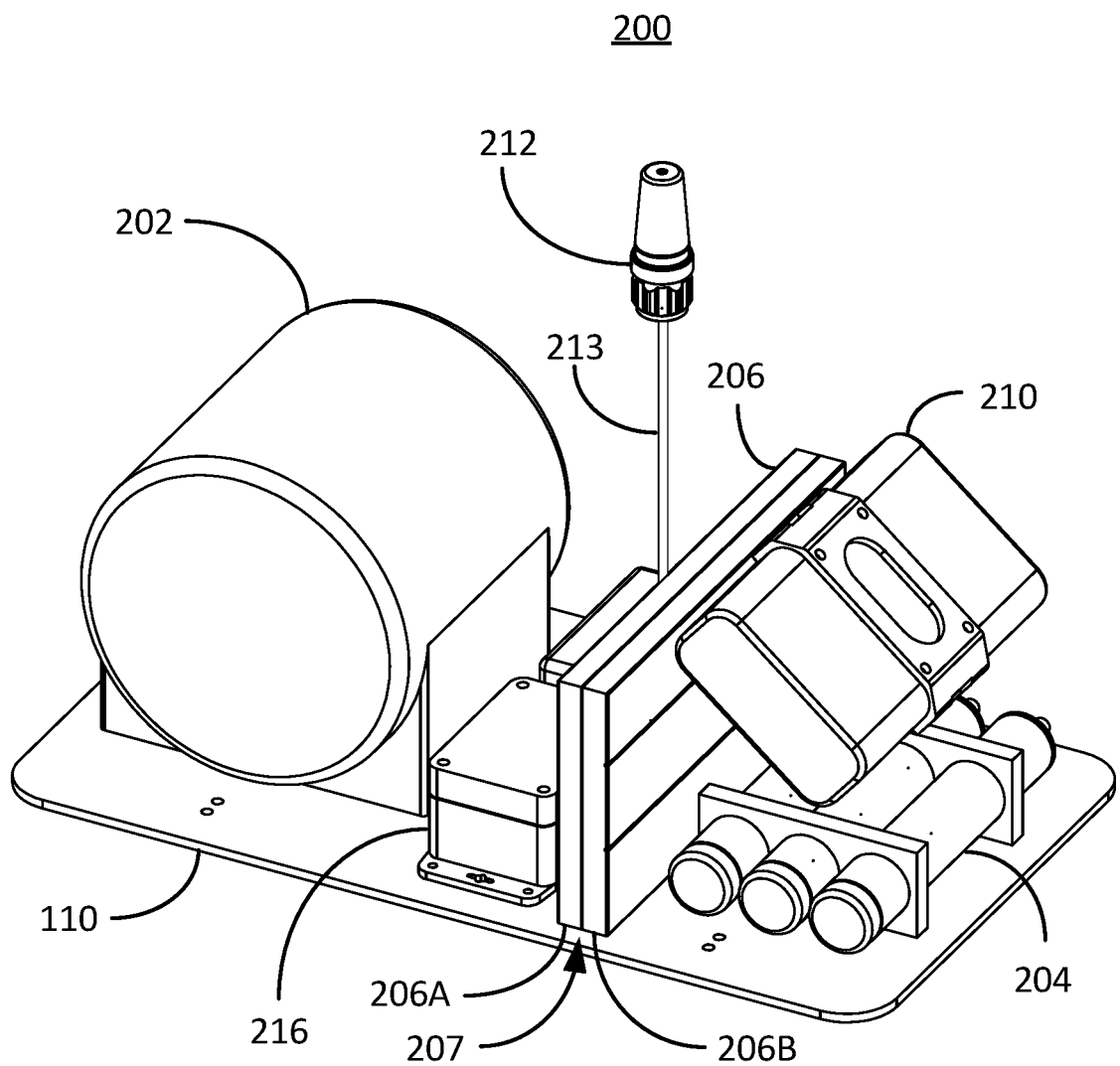
FIGS. 2A-2C are line drawings depicting the He-3 detector arrangement consistent with embodiments of the present invention.
Figure 2B:
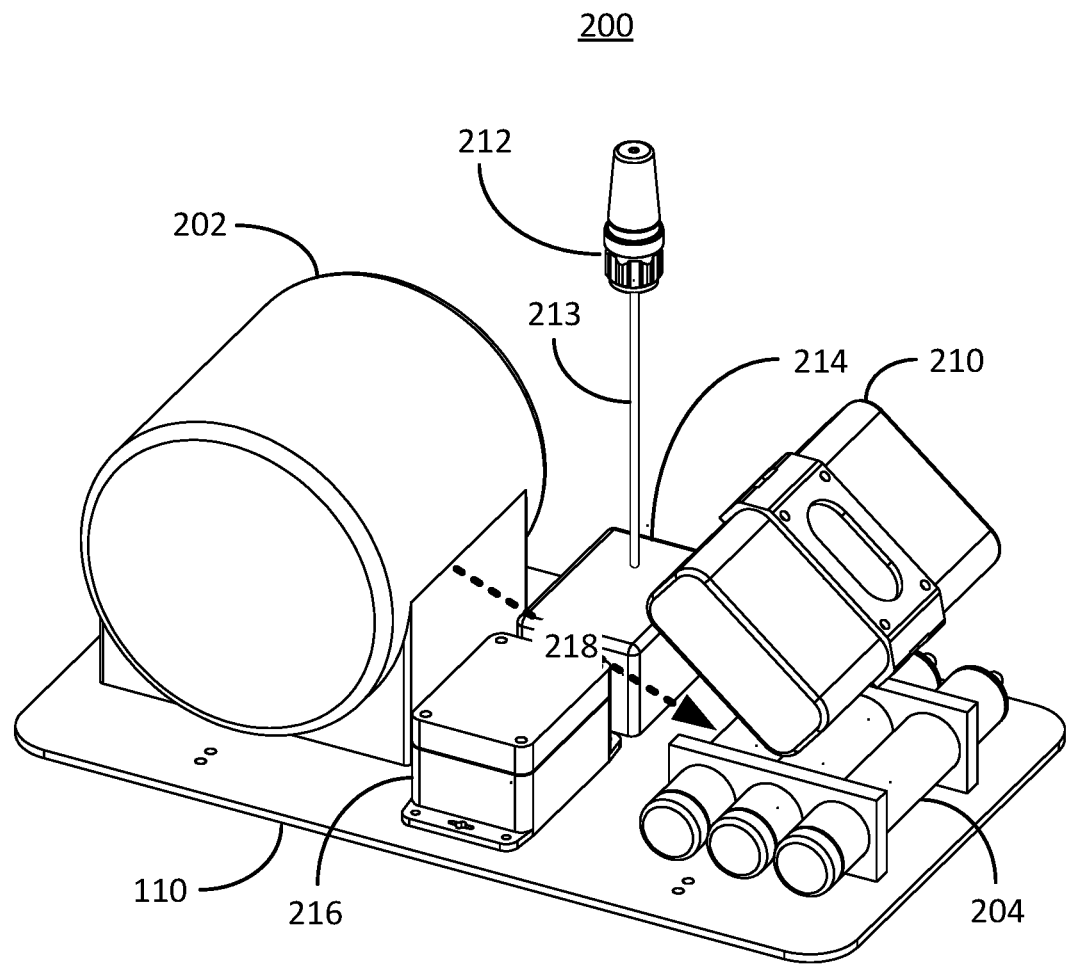
Figure 2C:
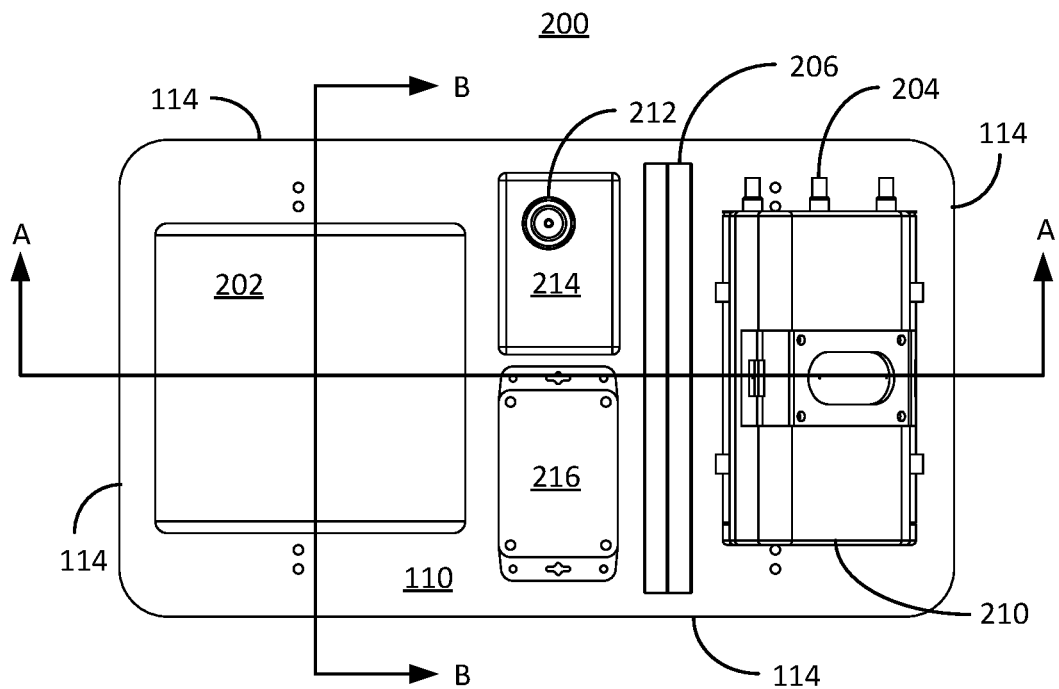

FIGS. 2A-2C are line drawings depicting the He-3 detector arrangement 200 (which is interchangeable with simply 'He-3 detector 200' or 'arrangement 200') consistent with embodiments of the present invention. As shown in FIG. 2A, is an isometric line drawing of the primary components of the He-3 detector 200 include a neutron shield 206 that is interposed between a thermal neutron source 202 and three thermal neutron detectors 204. The neutron shield 206 blocks the line-of-sight 218 of a percentage of thermal neutrons 222 that are emitted from the thermal neutron source 202 from impacting the thermal neutron detectors 204. The line-of-sight 218 is defined as a straight line along which an observer, in this case the thermal neutron source 202 has an unobstructed view of the thermal neutron detector arrangement 204. In one embodiment, the neutron shield 206 is envisioned to be two 1-2 inch thick borated HDPE (High density polyethylene) that is produced by EMCO Industrial Plastics, LLC, headquartered in Cedar Grove, NJ. The borated HDPE is specially designed for nuclear shielding applications. The material employs 5% Boron by weight to shield neutrons in a variety of applications including high intensity X-rays, cancer treatment facilities, hospitals, nuclear submarines and nuclear power plants. A 1-inch-thick plate will attenuate the thermal neutrons 222 to about 5% in the line-of-sight 218 on the other side of the shield 206, and two 1-inch-thick plate will attenuate the flux to about 0.025% of the thermal neutrons 222 in the line-of-sight 218 on the other side of the shield 206. In other words, two plate should attenuate or otherwise block 99.25% of the neutrons from reaching the thermal neutron detectors 204. In the present embodiment, the two plates 206A and 206B are separated by a lead sheet 207. As further shown, the neutron shield 206, the thermal neutron source 202, the thermal neutron detectors 204, the battery pack 210, the antenna 212 and antenna connection line 213 are all supported by the metal plate 110.

FIG. 2B is a line drawing that illustratively depicts the He-3 detector arrangement 200 of FIG. 2A but without the neutron shield 206 to show the line-of-sight 218 between the thermal neutron source 202 and thermal neutron detector apparatus 204. The line-of-sight 218 is the direct path between the thermal neutron source 202 and three thermal neutron detectors 204, which essentially comprise the thermal neutron detector apparatus 204.

The thermal neutron detector apparatus 204 is sensitive to the amount of neutrons 222 that impact the detector apparatus 204 and therefore is capable of providing information about the neutron concentrations it encounters. There are several commercially available thermal neutron detectors 204 including BF3 Counter Tubes from Mirion Technologies headquartered in Atlanta, Georgia. This thermal neutron detector uses boron trifluoride (BF3) neutron counters. The neutron sensitivity of these proportional counters is achieved by filling the tube with the gas boron-tri-fluoride, made of highly enriched Boron-10. Thermal neutrons react with the isotope Boron-10 emitting alpha particles, which produce ionization in the gas filling of the detector (electrons and gas ions). In the electrical field between the electrodes these charged particles will be accelerated and secondary ionization happens. This so called "gas amplification" multiplies proportionally the amount of charge generated in the tube.

FIG. 2C is a top view line drawing of the He-3 detector arrangement 200 depicting the elements with respect to the cut-lines A-A and B-B. For reference, the computer electronics enclosure 216 is shown, which contain the necessary computing and electronics to run the various electrical elements comprised by the He-3 detector 200 and the transmitter 214 that houses the communications transmitter or more likely a transceiver. The antenna 212 is linked to the communications circuitry in the transmitter 214. Also shown are the battery 210, thermal neutron source 202, the shield and the thermal neutron detector apparatus 204. The thermal neutron detector apparatus 204 comprises three detectors in this embodiment but can have as few as one detector or as many as desired. Cut-line A-A essentially bisects the metal plate 110 and the thermal neutron source 202, the shield and the thermal neutron detector apparatus 204. Cut-line B-B, which is orthogonal to cut-line A-A, bisects the thermal neutron source 202.

Figure 2D:
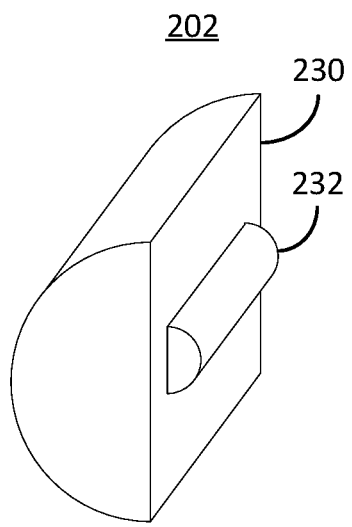
FIG. 2D is a block diagram depicting the thermal neutron source embodiment along cut-line B-B consistent with embodiments of the present invention.

FIG. 2D is a block diagram depicting the thermal neutron source embodiment 202 along cut-line B-B consistent with embodiments of the present invention. This embodiment of the thermal neutron source 202 can include an Americium Beryllium (AmBe) neutron source (core) 232 encapsulated within a hydrogen rich shell 230, which in this embodiment is envisioned to be a polyethylene shell. The polyethylene shell 230 thermalizes the neutrons by reducing their energy through collisions with the hydrogen nuclei in the polyethylene. AmBe thermal neutron sources are commercially available by QSA Global, Inc., headquartered in Burlington, MA. An alternative thermal neutron source 202 comprises an integrated moderator neutron generator, such as deuterium-tritium or deuterium-deuterium neutron generators, for example, which are commercially available from Adelphi Technology, Inc., headquartered in Redwood City, CA. Accordingly, certain embodiments of the present invention envision the thermal neutron source 202 being an off-the-shelf thermal neutron source readily commercially available.

Figure 2E:
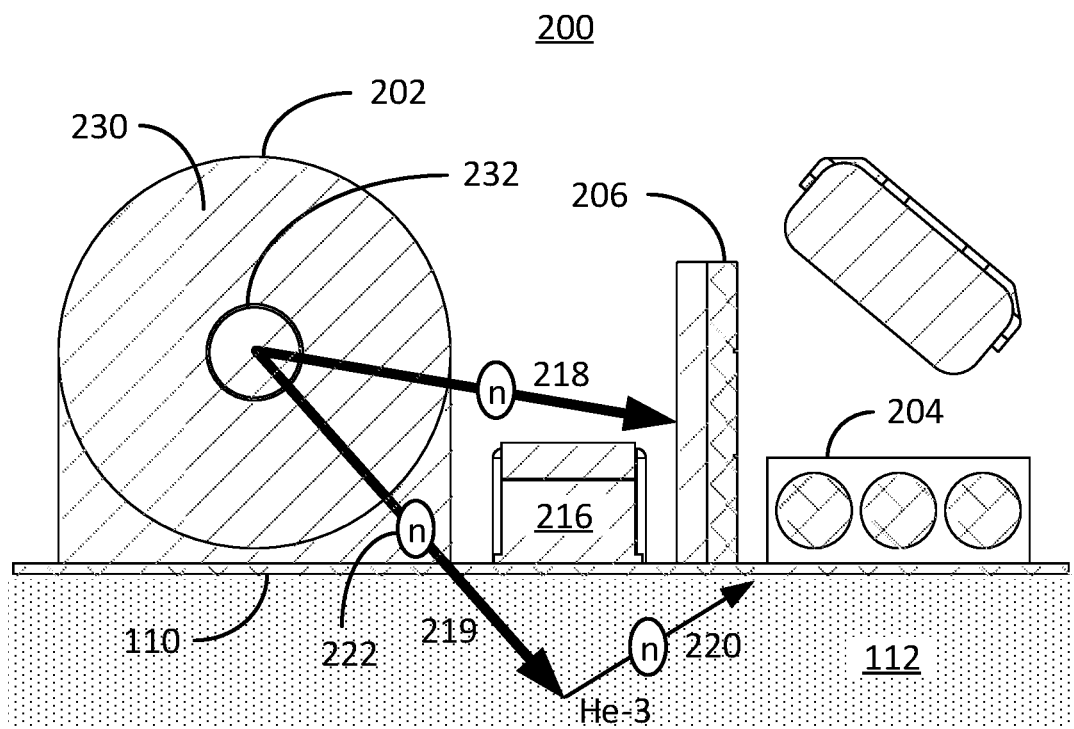
FIG. 2E is a line drawing of a cross-section of the He-3 detector arrangement along cut-line A-A consistent with embodiments of the present invention.

FIG. 2E is a line drawing of a cross-section of the He-3 detector arrangement 200 along cut-line A-A consistent with embodiments of the present invention. He-3 is known to absorb neutrons. Hence, the concentration of neutrons passing through He-3 will consequently be reduced. In the present arrangement 200, some of the neutrons emitted from the thermal neutron source 202, as shown in arrow 219, will backscatter from the regolith 112 to the thermal neutron detector 204 (see narrow arrow 220) with some of the neutrons in arrow 219 being absorbed by He-3 present in the regolith 112. Accordingly, the concentration of He-3 in the regolith 112 will be inversely proportional to the concentration of neutrons detected by the thermal neutron detector 204 relative to those neutrons emitted by the thermal neutron source 202. In other words, the higher the concentration of He-3 present in the regolith 112, the lower the number of neutrons will reach the thermal neutron detector 204, which is represented by the narrower arrow 220. The neutrons in the line-of-sight 218 of the neutron detector 204 are blocked by the neutron shield 206 from hitting the neutron detector 204 to improve the resolution of the backscattered neutron concentration 220. The metal plate 110, which in some embodiments is aluminum, does not change the number of neutrons that penetrate into the regolith 112 (as emitted by the thermal neutron source 202). In accordance with this arrangement 200, the concentration of neutrons detected by the thermal neutron detector 204 are compared with the concentration of neutrons produced by the thermal neutron source 202 to provide an indication of He-3 concentration in a region of regolith 112. Though an accurate amount of He-3 may not be obtainable, a relative amount is, which is sufficient to identify and map out high interest areas on the Moon 122 for mining He-3 based on sampling different areas/regions on the Moon 122. Data acquisition and computing can be done via the electronics and computer system 216 on the He-3 detector arrangement 200.

Figure 3:
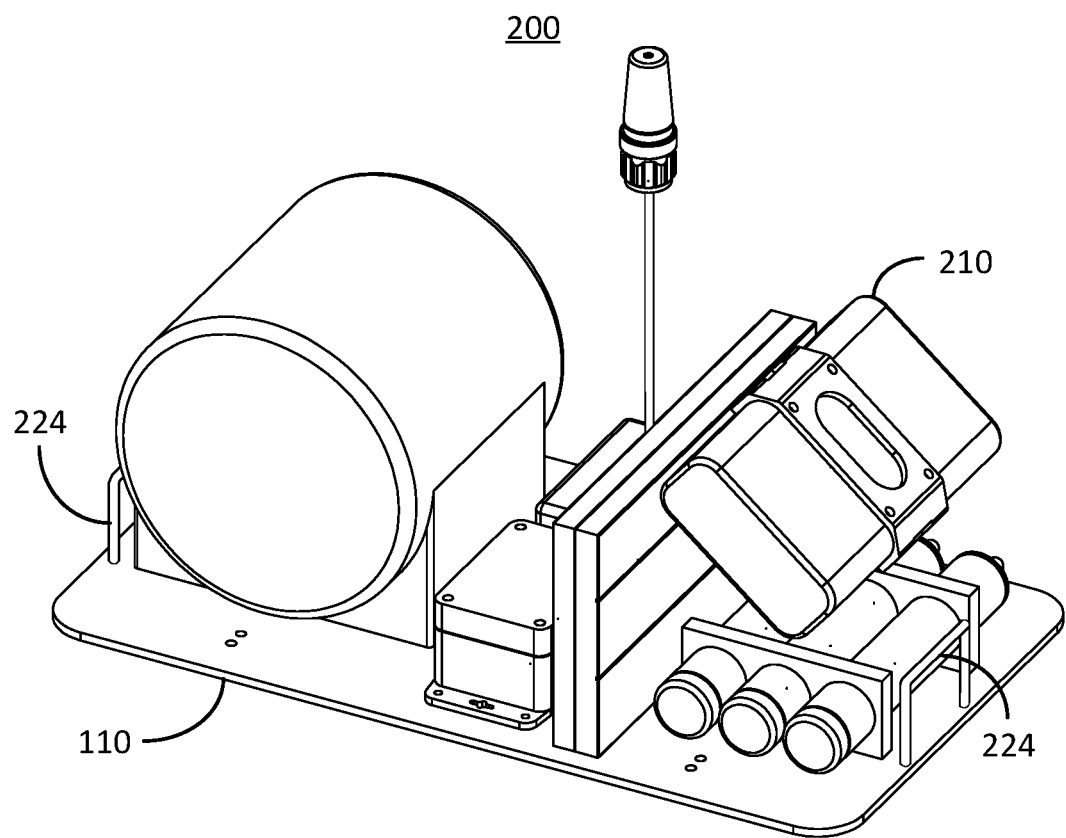
FIG. 3 is a line drawing of another embodiment of the He-3 detector arrangement comprising handles consistent with embodiments of the present invention.

FIG. 3 is a line drawing of another embodiment of the He-3 detector arrangement 200 comprising handles 224 that can be used to carry or otherwise transport the He-3 detector arrangement 200 from location to location manually or via a robot.

Figure 4A:
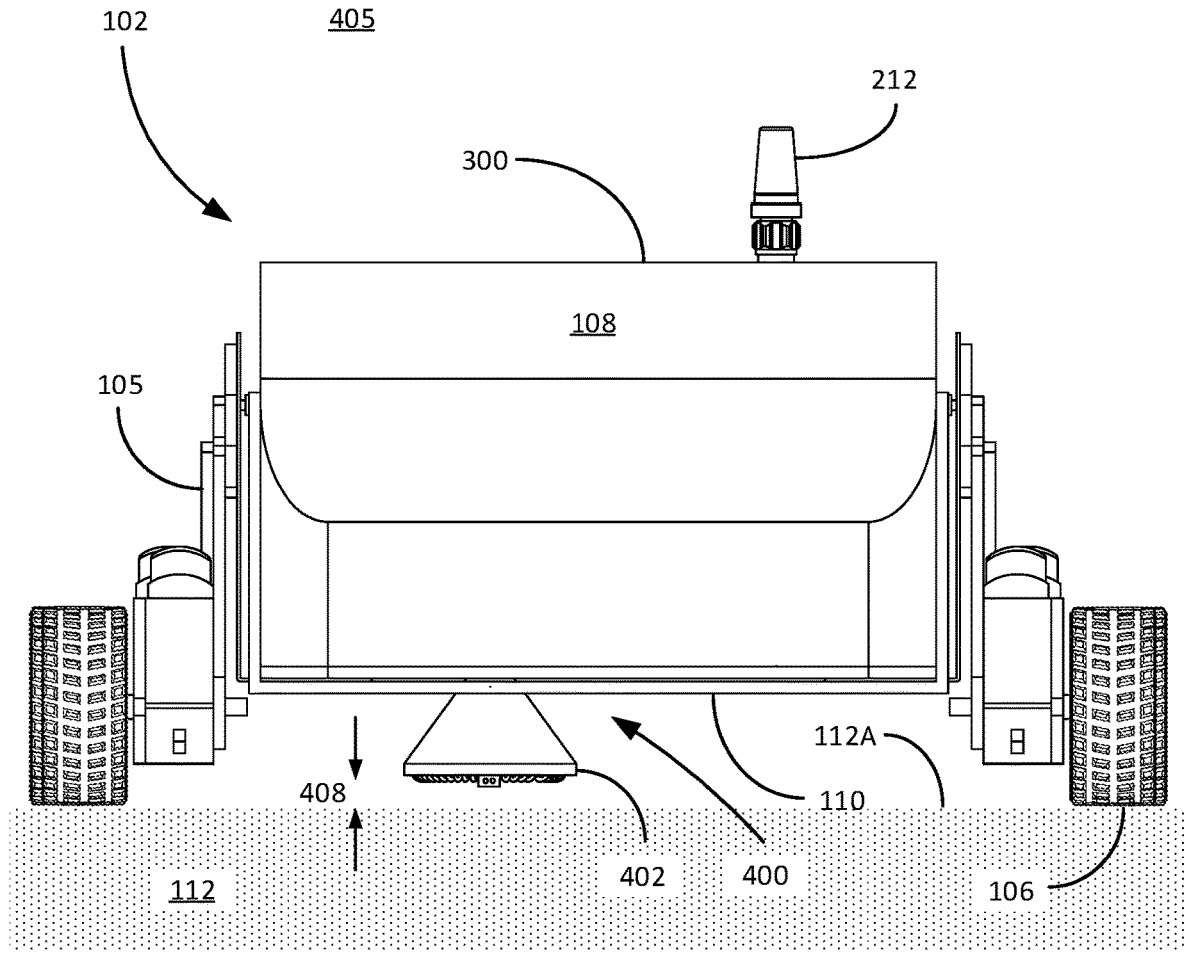
FIGS. 4A-4C depict a He-3 detector arrangement that uses an open environment mass spectrometer embodiment consistent with embodiments of the present invention.
Figure 4B:
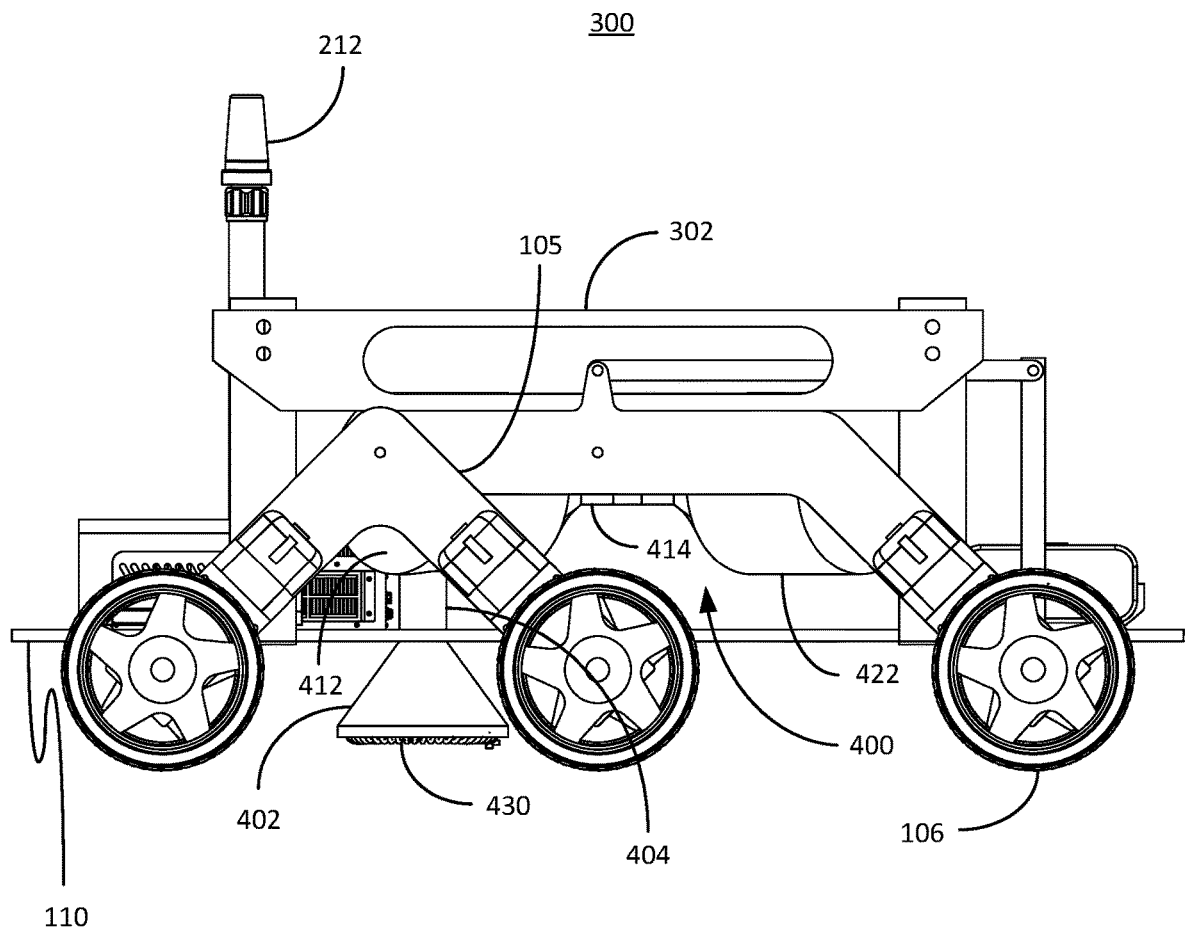
Figure 4C:
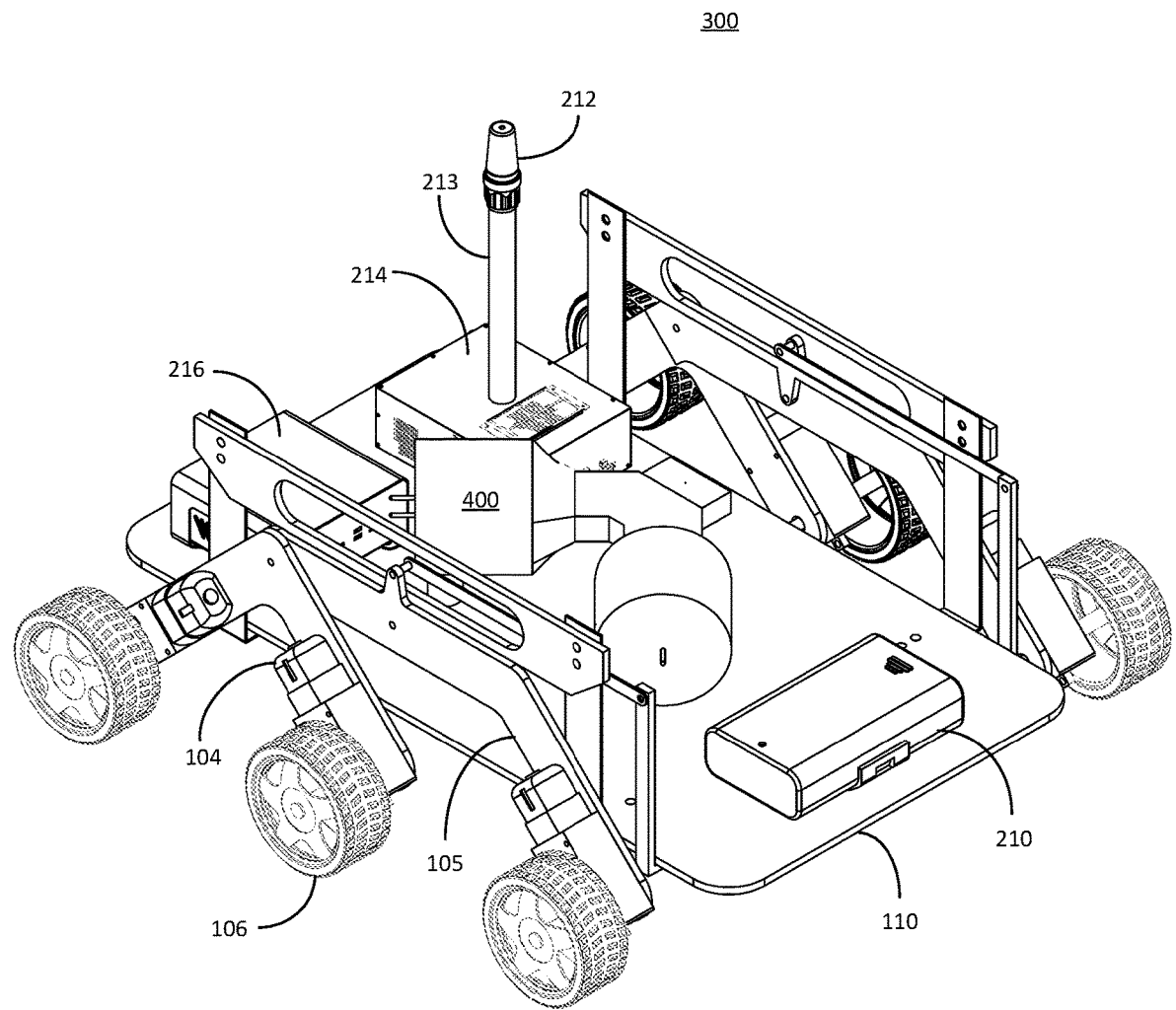

FIGS. 4A-4C depict a He-3 detector arrangement that uses an open environment mass spectrometer embodiment consistent with embodiments of the present invention. Here the mass spectrometer arrangement 300 is open to the environment 405, meaning there is no pressure chamber that surrounds the mass spectrometer 400, rather the mass spectrometer 400 functions at the ambient pressure around the mass spectrometer arrangement 300. This is made possible by the low pressure on the Moon 122. All the conventional mass spectrometers today operate in a low-pressure chamber, which necessarily accompanies or is otherwise associated with conventional mass spectrometers. FIG. 4A is a front view line drawing of a mass spectrometer arrangement 300, which generally comprises a rover 102, or some other mobile carrier, such as a dispersion pod (not shown but of which many dispersion pods can be released spreading out over a large area of the Moon 122, such as hundreds of square meters to hundreds of square kilometers, for example), a skipper 120 of FIG. 1B, or a hand-held carrier 224 of FIG. 3 all of which being capable of holding a mass spectrometer 400. As shown here, the rover 102 houses the majority of the mass spectrometer 400 in a rover cover 108 and rover base 110. The rover 102 is configured to move to different locations on the surface 112A of the Moon 122 (or some other extraterrestrial body) to take concentration samples of He-3 at each of the different locations. There is an antenna 212 connected to a transceiver (not shown) to transmit He-3 concentration data at each location to a receiver of the concentration data, such as a central hub or other targeted recipient desirous of obtaining the data. The mass spectrometer 400 intakes (or sniffs) for He-3 via an intake port 434 (of FIG. 5C) at the large end of an intake funnel 402. The intake funnel 402 (intake funnel rim 409) is in close proximity 408 to the regolith surface 112A. Close proximity 408 is defined herein to be less than 12 inches. In certain embodiments, the distance 408 between the intake funnel 402 and the regolith surface 112A is preferably less than 6 inches and can be positioned right at or in contact with the regolith surface 112A. The rover's wheels 106 and suspension 105 are called out for reference.

FIG. 4B is a side view line drawing of the mass spectrometer arrangement 300 with the rover cover 108 removed from the rover 102 to reveal the components in relation to the frame 302. The mass spectrometer 400 is shown mostly suspended above the rover base plate 110 with exception to the intake funnel 402, which extends from the base plate 110 to less than 12 inches above the regolith surface 112A. As shown in more detail in connection with FIG. 5A, the intake funnel 402 is engaged with a funnel joiner 404, which is attached to an ionizer and accelerator housing 412, an angled magnet housing 414 and a detector housing 422. The suspension 105, wheels 106 and antenna 212 are called out for reference.

FIG. 4C is an isometric line drawing of the mass spectrometer arrangement 300 with the rover cover 108 removed from the rover 102 revealing the components in relation to the frame 302. An upper view of the mass spectrometer 400 is presented along with a computer system 216 and the transmitter 214 with the antenna 212 and antenna connection line 213. In this embodiment, a battery pack 210 attached to the base plate 110 is configured to provide power to the rover 102 and the electronics connected therewith. As mentioned earlier, this could be boosted by a regenerative energy source, such as solar panels (not shown) on the rover cover 108. In this embodiment, shock absorbers 104 are linked between the suspension 105 and wheels 106 to provide a smoother/more controlled ride for the equipment carried by the rover 102.

Figure 5A:
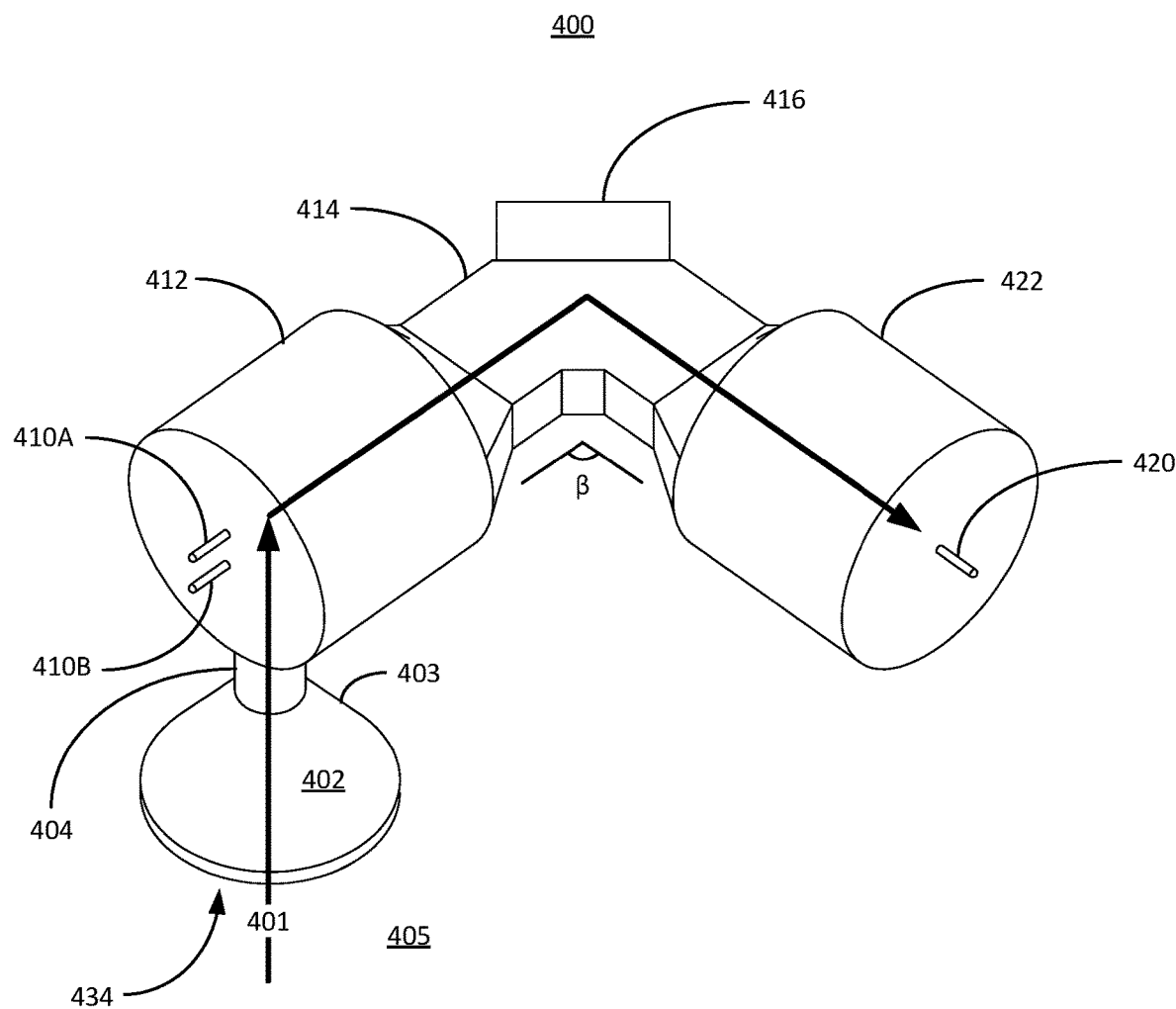
FIGS. 5A-5D are line drawings depicting different views of the mass spectrometer embodiment 400 consistent with embodiments of the present invention.

FIGS. 5A-5D are line drawings depicting different views of the mass spectrometer embodiment 400 consistent with embodiments of the present invention. FIG. 5A is an isometric view of the mass spectrometer 400 showing the base-particle pathway 401 depicted by the thick arrow. The base-particle pathway 401 is so called because it is the pathway where base-particles 460, defined by atoms and single molecules, flow through the mass spectrometer 400. The base-particle pathway 401 starts at the intake port 434 of the intake funnel 402, traversing through the funnel joiner element 404 and into the ionizer and accelerator housing 412 before it makes it to the detector 464 (of FIG. 5C) in the detector housing 422 via the angled magnet housing 414. As shown, the intake funnel 402 comprises a funnel shaped housing 403 that extends from the intake port 434 to an exit port 435 (of FIG. 6A) at the funnel joiner 404. In this embodiment, the exit port 435 is smaller than the intake port 434 (about 20% the size of the intake port 434). Certain embodiments contemplate the intake port 434 being at least twice the area of the exit port 435. In this embodiment, the angled magnet housing 414 is angled in the center at β, which can be between 10 and 90 degrees, for example. A magnet arrangement 416 is essentially at the apex of the angled housing 414 to redirect the path of the base-particles 460, which in this case is He-3, to the detector 464. The redirected path of the base-particles 460 is β+/−some offset depending on the mass of the base-particle 460. The offset is likely less than 10 degrees.

Figure 5B:
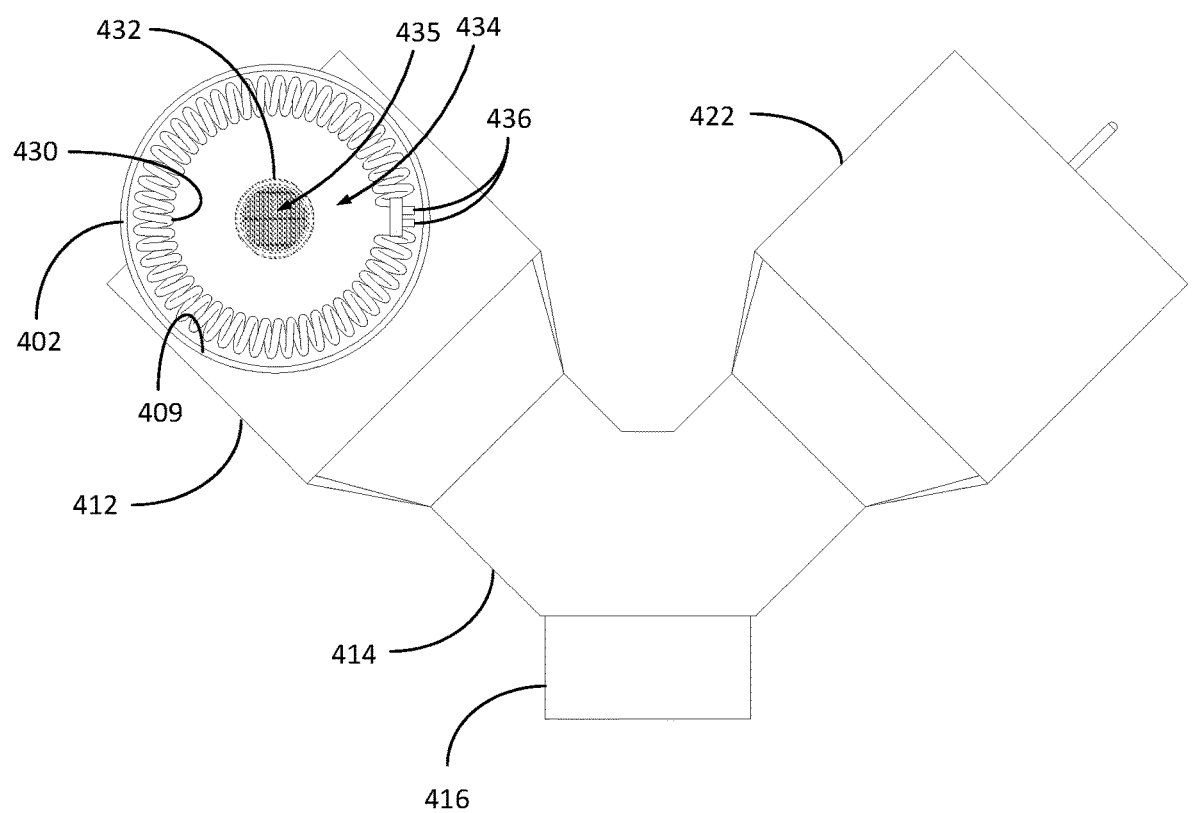

FIG. 5B is a bottom view of the mass spectrometer 400 prominently showing the funnel intake port 434. As depicted, the intake funnel 402 comprises a heating element 430, or some other granular surface disrupter, such as a laser, ultrasonic emitter, microwave emitter or some other energizer that can liberate He-3 from the granular/regolith 112. This heating element 430 is powered by the electrical leads 436. As shown here, the funnel intake port 434 is defined by the funnel intake port rim 409. Also shown is a filter 432, such as a HEPA (High Efficiency Particle Air) filter, disposed in the exit port 435. The filter 432 is disposed at (or near) the exit port 435 to filter out regolith or unwanted solid particles that are bigger than the base-particles intended for sampling in the mass spectrometer 400. The ionizer and accelerator housing 412, angled magnet housing 414, detector housing 422 and magnet arrangement 416 are shown here for reference.

Figure 5C:
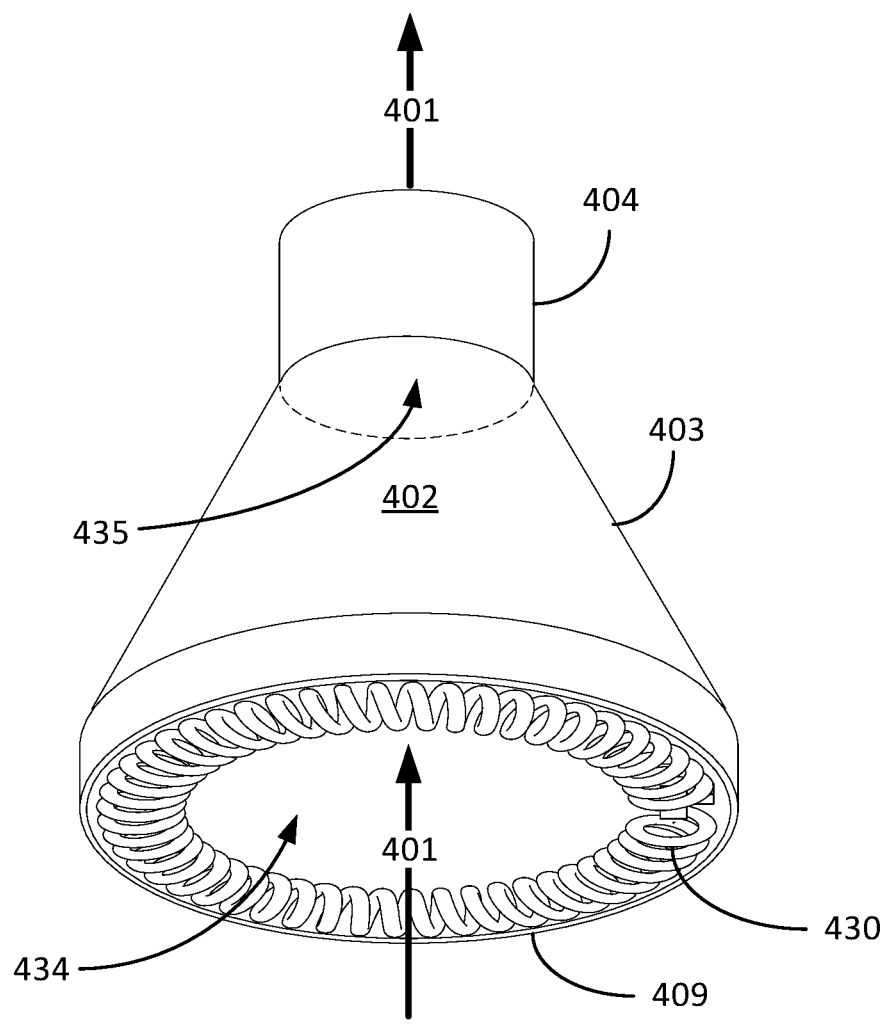

FIG. 5C is an isometric line drawing of the intake funnel 402 and funnel joiner 404 showing the base-particle pathway 401 leading into the intake port 434 and exiting out the funnel joiner 404. The funnel exit port 435 is hidden, thus shown by the dashed line. The heating element 430 is shown slightly extending from the funnel intake port rim 409.

Figure 5D:
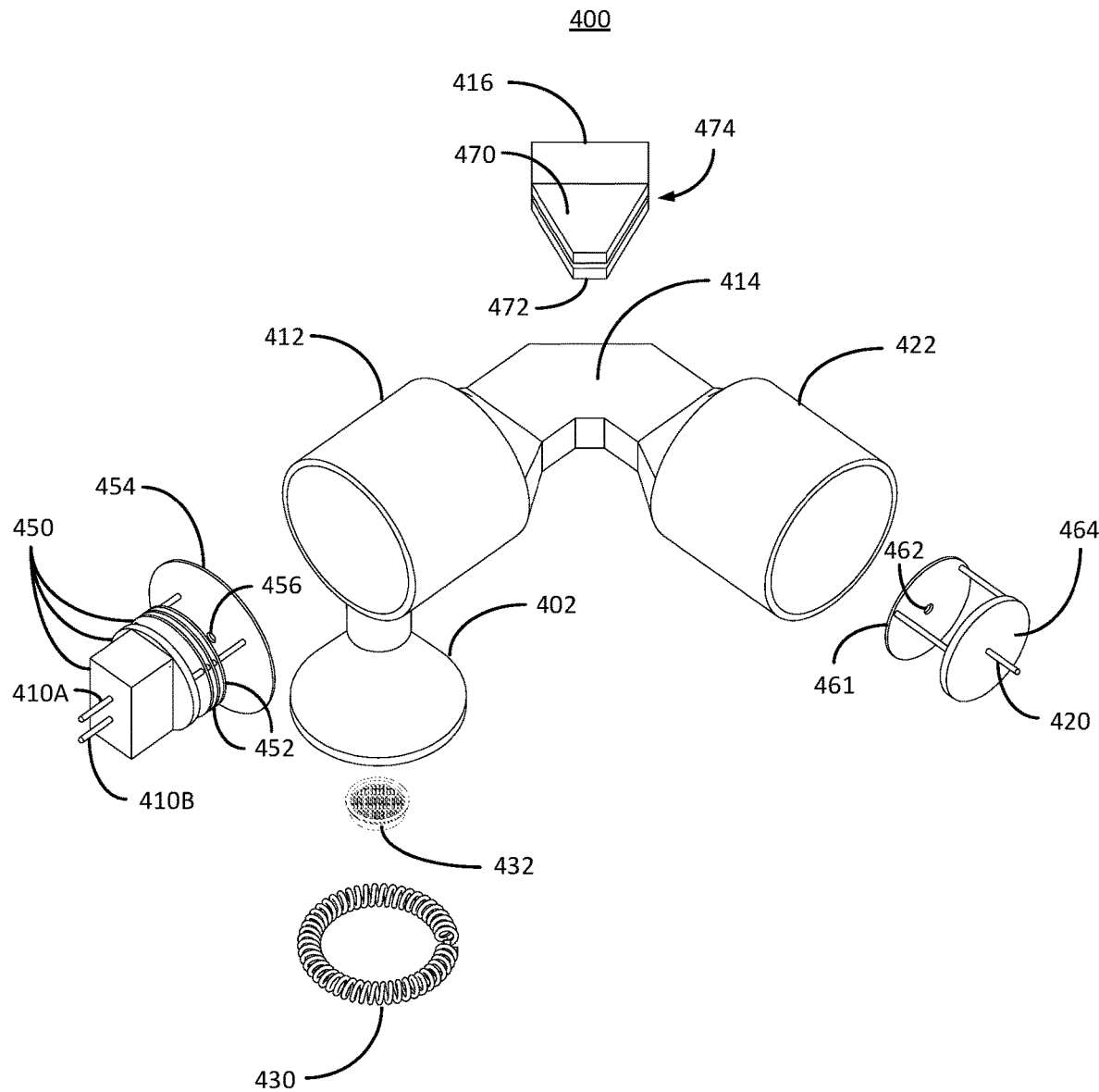

FIG. 5D is an exploded view of the mass spectrometer 400 consistent with embodiments of the present invention. With respect to the intake funnel arrangement 402, extending therefrom are the heating element 430 and the filter 432. To the left, an ionizer 450 with the ionizer leads 410A and 410B, a base-particle accelerator 452, a shield plate 545 and base-particle aperture 456 are shown extending from the ionizer and accelerator housing 412. The magnet arrangement 416 is shown extending behind the angled magnet housing 414. The magnet arrangement 416 generally comprises a first split-pole magnet 470 separated by a second split-pole magnet 472 by a gap 474. The base-particles 460, in this embodiment He-3, are aimed at the gap 474 and are redirected (at angle β+/−some offset) by the split-pole magnets 470 and 472 when passing through the post magnet tuning aperture 462. The redirected ionized base-particles 460B pass through a post magnet tuning aperture 462 in the post magnet tuning plate 461 along the way to the detector plate 464. The detector probe 420 picks up the signal of the He-3 from the detector plate 464 and relays the signal information to the computing system 216.

Figure 6A:
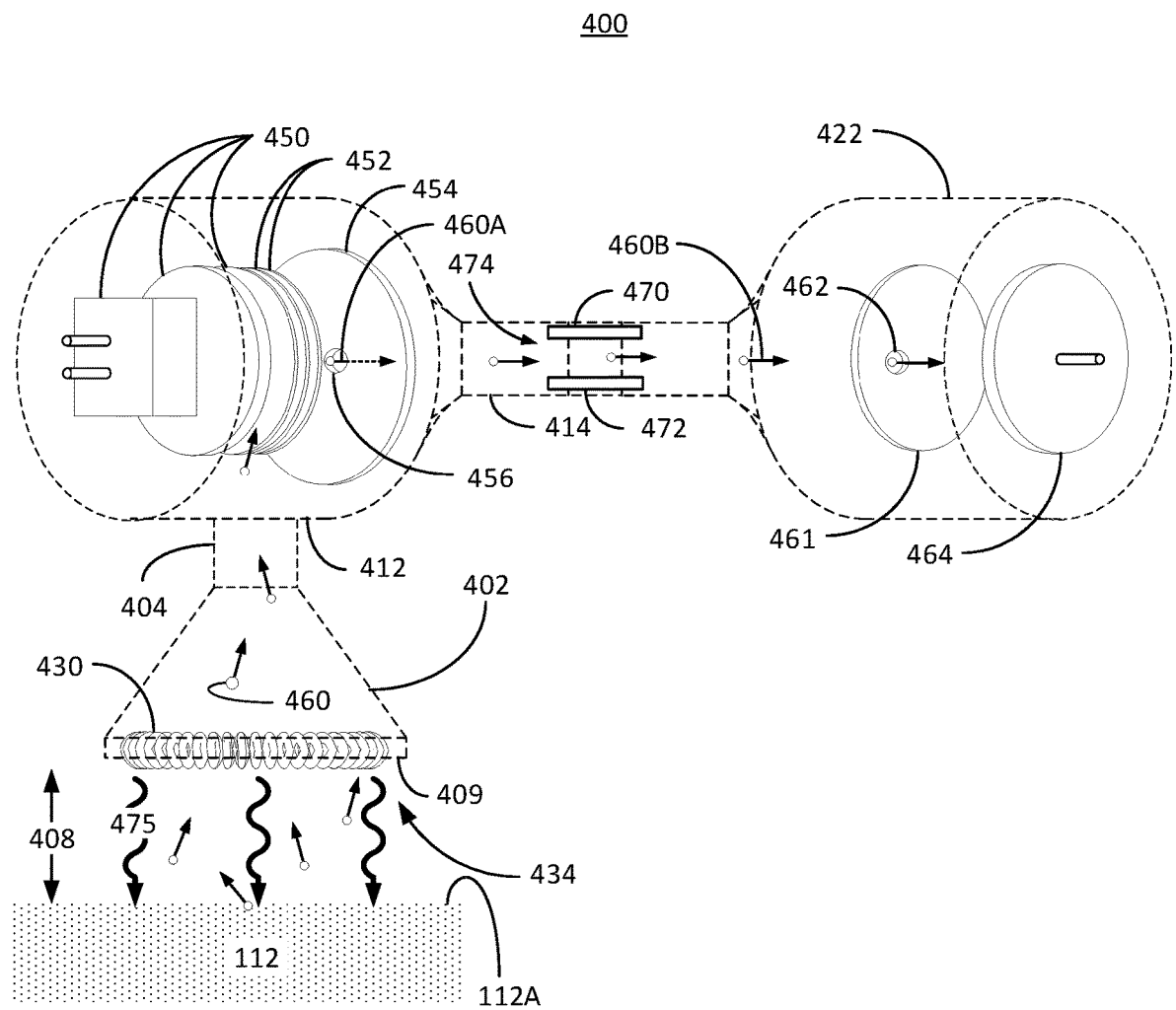
FIG. 6A is a line drawing depicting an embodiment of the components of the mass spectrometer 400 in action.
Figure 6B:
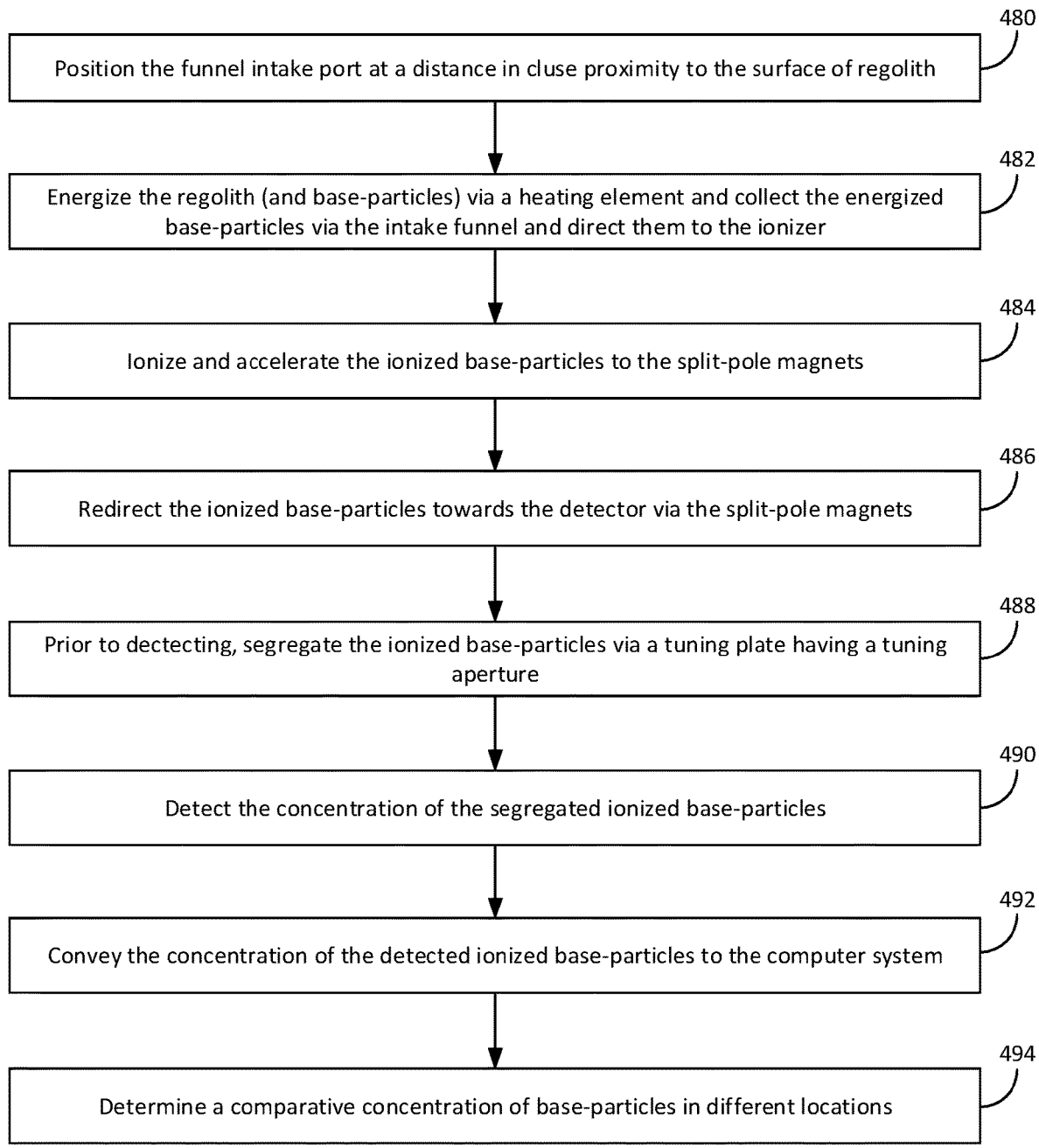
FIG. 6B is a block diagram of a method of using the open environment mass spectrometer.

FIG. 6A is a line drawing depicting an embodiment of the components of the mass spectrometer 400 in action. The embodiment described is a high-level explanation of the basic elements of the mass spectrometer 400, which depending on the design, can include more elements of exclude some of the elements shown for the sake of efficiency, which would be understood by those skilled in the art. The high-level explanation of FIG. 6A is described in-view of the block diagram FIG. 6B. The funnel intake port rim 409 is positioned at a distance 408 in close proximity to the regolith surface 112A, defined less than 12 inches (step 480). The heater 430, which is one embodiment for a granular surface disrupter, radiatively heats 475 the regolith 112 thereby releasing base-particles 460 retained in or on the regolith 112. Certain embodiments envision a shield (not shown) having a rim 409 that extends from the intake funnel 402 to the regolith surface 112A to shield and better collect a higher concentration of the liberated base-particles 460.

With continued reference to FIG. 6A, some of the liberated base-particles 460 are energized by the heat 475 to move through the intake funnel 402 and funnel joiner 404 into the ionizer housing 412 (step 482). The base-particles 460 are directed to an ionizer region in the ionizer 450 where electrons are emitted to bombard the base-particles 460 thus creating ionized base-particles 460A (step 484). The ionized base-particles 460A are accelerated via an electric field produced by the accelerator 452 and directed through an accelerator aperture 456 located in an accelerator tuning plate 454. The accelerated ionized base-particles 460A hurl towards the gap 474 in between the split-pole magnets 470 and 472 (step 486). The split-pole magnets 470 and 472 redirect or otherwise bend the trajectory of the ionized base-particles 160A in the angled magnet housing 414 in predictable angle β+/−some offset, depending on the mass of the ionized base-particle 160A (step 488). The present embodiment comprises a post magnet tuning plate 461 having a post magnet tuning aperture 462 that segregates the target post redirected ionized base-particle 160B (step 490). In the case of He-3, the post magnet tuning plate 461 has a post magnet tuning aperture 462 that segregates redirected ionized He-3 160B. The segregated post redirected ionized base-particles 160B, such as He-3, are detected by the detector plate 464, which conveys a number/concentration of the base-particles 160B in the sampled location of the regolith 112 (step 492). As the rover 102, or some other mobile carrier supporting the mass spectrometer 400, moves from location to location 152 to 154, for example, relative/comparative concentrations of target base-particles 160, such as He-3, can be established and at least stored at the mass spectrometer arrangement 300 if not transmitted to a remote receiver (not shown) via the antenna 212 (step 494). The comparative concentrations do not require an exact number of target base-particles 160 in a sampled area, rather a respective concentration of target base-particles 160, such as He-3, to better target high yield regions to mine.

Figure 7:
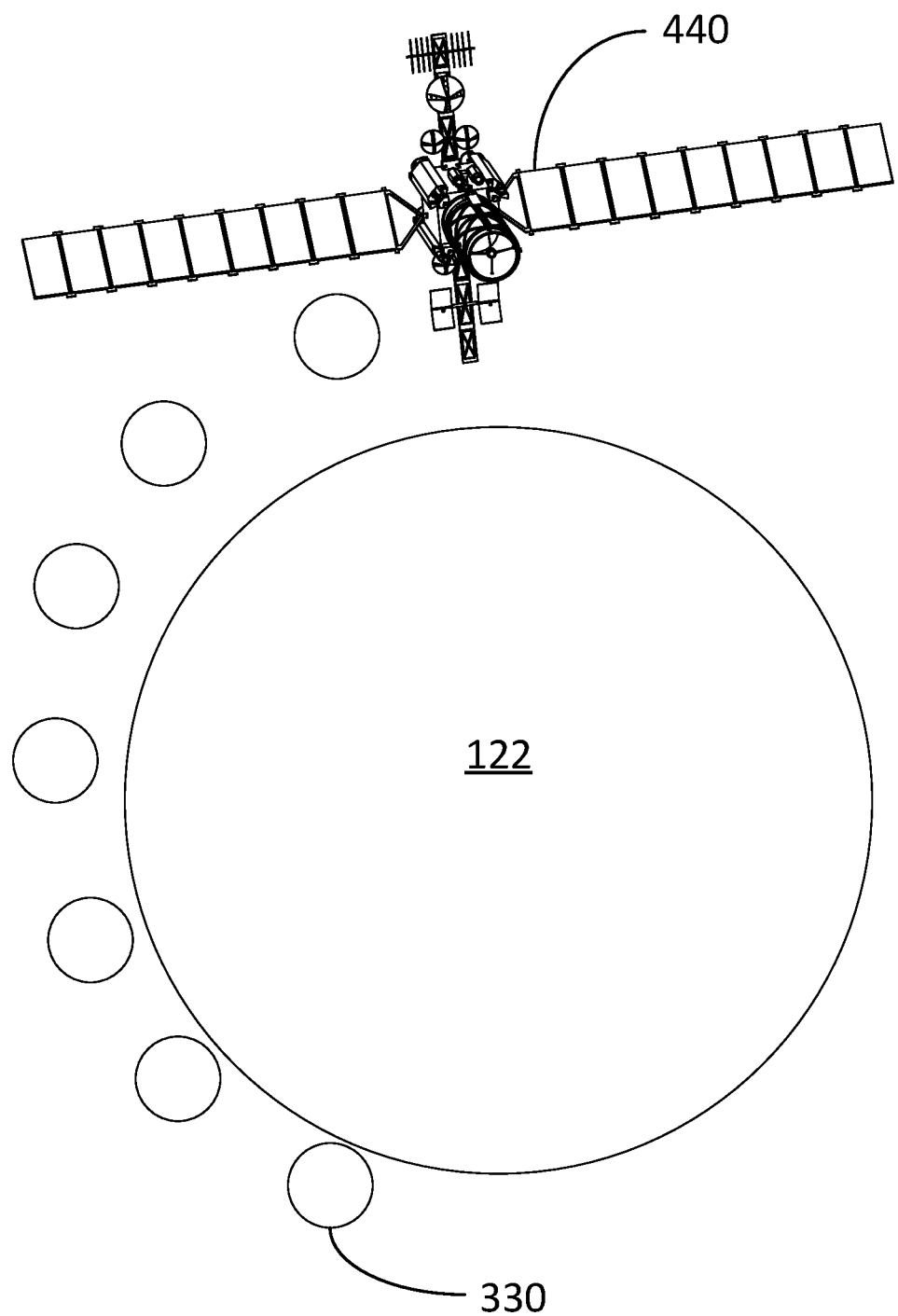
FIG. 7 is a line drawing that illustratively depicts an orbiting deployment vehicle deploying mass spectrometer dispersion pods on the surface of the Moon consistent with embodiments of the present invention.

FIG. 7 is a line drawing that illustratively depicts an orbiting deployment vehicle deploying mass spectrometer dispersion pods 330 consistent with embodiments of the present invention. Certain embodiments envision a deployment vehicle 440 that is orbiting around the Moon 122, or some other extraterrestrial body, deploying a plurality of the mass spectrometer dispersion pods 330 on various locations on the Moon 122. The mass spectrometer dispersion pods 330 can be, but is not necessarily, a onetime use device that transmits a concentration of target base-particles, such as He-3, back to the deployment vehicle 440 or to some other target location. The mass spectrometer dispersion pods 330 are further envisioned to be held level (maintain an upright orientation when landing) with a gyroscope or jet pack/s (not shown). Optionally, the mass spectrometer dispersion pods 330 can be equipped with a mechanical linkage (such as arms) that are configured to right the corresponding mass spectrometer dispersion pod 330 once it makes it to the Moon's surface 112A.

With the present description in mind, below are some examples of certain embodiments illustratively complementing some of the apparatus embodiments discussed above and presented in the figures to aid the reader. Accordingly, the elements called out below are provided by example to aid in the understanding of the present invention and should not be considered limiting. The reader will appreciate that the below elements and configurations can be interchangeable within the scope and spirit of the present invention. The illustrative embodiments can include elements from the figures.

In that light, certain embodiments of the present invention envision a mass spectrometer arrangement 300 (as shown in FIGS. 4A-4C) that comprises a mass spectrometer 400 carried around on a mobile carrier 102. The mass spectrometer 400 (As depicted in FIGS. 5A-5D) comprises a base-particle pathway 401 defined as beginning from an intake port 434 and ending at a detector plate 464. The particle pathway 401 traverses through the mass spectrometer 400. The mass spectrometer 400 further comprises an intake funnel 402 having a funnel shaped housing 403 that extends from the intake port 434 to an exit port 435, wherein the exit port 435 is smaller than the intake port 434. The intake port 434 is unobstructed from directly interfacing an open environment 405 and is configured to be in communication with the open environment 405 during operation. The mass spectrometer 400 further comprises an ionizer 450 adjacent to the exit port 435, wherein the mass spectrometer ionizer 450 is configured to ionize base-particles 460 in a portion of the base-particle pathway 401. The mass spectrometer 400 further comprises a detector housing 422 that comprises the detector plate 464 and an angled housing 418 having split-pole magnets 470 and 472 that are configured to direct the base-particles 460 at an angle β+/−an offset, such as less than 10 degrees, along the base-particle pathway 401. The mass spectrometer arrangement 300, and in some embodiments, the intake funnel 402, has a granular surface disrupter 430 configured to liberate the base-particles 460 from a granular surface 112 that is external to the mass spectrometer arrangement 300. The mass spectrometer arrangement 300 comprises a mobile carrier 102 that supports the mass spectrometer 400. The mobile carrier 102 is configured to position the intake port 434 over the exterior granular surface 112.

The mass spectrometer arrangement 300 is envision having the mass spectrometer arrangement 300 being devoid of a pressure chamber adapted to maintain a pressure that is lower than the open environment 405.

Certain embodiment of the mass spectrometer arrangement 300 envision the granular surface disrupter 430 being a heating element.

Certain embodiment of the mass spectrometer arrangement 300 envision the exit port 435 being at least one-half the area of the intake port 434.

Certain embodiment of the mass spectrometer arrangement 300 envision the open environment 405 being below 7 millitorr.

Certain embodiment of the mass spectrometer arrangement 300 envision the base-particles 460 include helium-3 and the mass spectrometer 400 being tuned to the He-3.

Certain embodiment of the mass spectrometer arrangement 300 envision the mobile carrier being selected from a group consisting of a rover 102, a dispersion pod 440, a skipper 120, or a hand-held carrier 224.

Certain embodiment of the mass spectrometer arrangement 300 envision the mobile carrier being configured to position the intake port 434 within 6 inches of the exterior granular surface 112A.

Certain embodiment of the mass spectrometer arrangement 300 envision the mass spectrometer arrangement 300 being configured to determine a concentration of He-3 in the granular soil 112 at a second location 154 and at a first location 152. This can further comprising a wireless communicator that comprises an antenna 212 and transmitter 214 configured to communicate the concentration to a receiver (not shown).

Another embodiment of the present invention envisions a mass spectrometer system 300 comprising a mass spectrometer 400, a heating element 430, and a mobile carrier 102. The mass spectrometer 400 can comprise a channel 401 that extends through the mass spectrometer system 200 from an intake port 434 to a detector 464. The mass spectrometer 400 can further comprise an intake funnel 402 comprising an intake port 434 configured to receive base-particles 460 directly from an open environment 405, the intake funnel 402 configured to direct the base particles 460 to an exit port 435. The mass spectrometer 400 can further comprise an ionizer 450 that is configured to ionize the base-particles 460 received from the exit port 435. The mass spectrometer 400 also comprises split-pole magnets 470 and 472 that are disposed in an angled housing 418 between the ionizer 450 and the detector 464. A heating element 430, which can be in the mass spectrometer 400 or elsewhere in the system 300, is configured to liberate the base-particles 460 from a granular surface 112 via heat. The granular surface is not part of the mass spectrometer system 300. The system 300 envisions a mobile carrier 102 configured to position the intake port 434 in close proximity to the exterior granular surface 112.

Some embodiments of the mass spectrometer system 300 further envision the exit port 435 being smaller than the intake port 434.

Certain embodiments of the mass spectrometer system 300 further envision the intake port 434 being in communication with the open environment 405 during operation, wherein there is no pressure chamber associated with the mass spectrometer system 300. Associated is defined herein to be part of the system 300 or having a direct cooperating relationship with the system 300.

Certain embodiments of the mass spectrometer system 300 envision the mass spectrometer 400 further comprising an accelerator between the ionizer 450 and the split-pole magnets 470 and 472.

Some embodiments of the mass spectrometer system 300 further the split-pole magnets 470 and 472 being configured to direct the base-particles 460 at an angle β+/−an offset (defined as less than 10 degrees) along the base-particle pathway 401.

Some embodiments of the mass spectrometer system 300 further envision the mass spectrometer 400 being tuned to determine a concentration of He-3 in the exterior granular surface 112 at a second location 154 and at a first location 152.

Certain embodiments of the mass spectrometer system 300 envision the mobile carrier being selected from a group consisting of a rover 102, a dispersion pod 490, a skipper 120, or a hand-held carrier 224.

Some embodiments of the mass spectrometer system 300 envision the open environment 405 being below 7 millitorr.

In yet another embodiment of the present invention, an open environmental mass spectrometer arrangement 300 is envisioned to comprise a mass spectrometer 400 being positioned and supported by a mobile carrier 102. The mass spectrometer 400 can have an intake funnel 402 that is configured to receive base-particles 460 through an intake port 434 directly from an open environment 405. The intake funnel 402 is configured to direct the base particle 460 into the mass spectrometer 400. The arrangement 300 can further comprise a heating element 430 configured to liberate the base-particles 460 from regolith 112 via heat, the regolith 112 is not part of the open environmental mass spectrometer arrangement 300. Some embodiments envision the mass spectrometer 400 comprising the heating element. The arrangement 300 further comprises a mobile carrier 102 that is configured to position the intake port 434 over the regolith 112, typically less than 12 inches.

One embodiment of the open environmental mass spectrometer arrangement 300 envisions the mass spectrometer 400 being maintained at a pressure essentially equal to that of the open environment 405.

Still other embodiments of the present invention envision a He-3 detection arrangement 200 as shown in FIGS. 2A-2E comprising a thermal neutron source 202 and a thermal neutron detector 204. More specifically, the thermal neutron source 202 can comprise a thermal neutron emitter 232 encapsulated in a hydrogen rich material 230, wherein the thermal neutron source 202 is configured to emit thermal neutrons 222 in all directions (see FIG. 2E). The thermal neutron detector 204 can be configured to detect a concentration 220 of the thermal neutrons 222. In the arrangement 200, a neutron shield 206 is interposed between the thermal neutron source 202 and the thermal neutron detector 204. The neutron shield 206 is configured to block some of the thermal neutrons 222 emitted from the thermal neutron source 202 that are aimed at the thermal neutron detector 204 (such as attenuating at least 90% of the neutrons 222 that are between the shield 206 and the thermal neutron detector 204). A power source 210, such as a battery or solar system, for example, is configured to provide power to the thermal neutron source 202 and the thermal neutron detector 204. A metal plate 110 has a periphery 114, which is the sidewall boundary of the metal plate 110 shown by the four side 114. The thermal neutron source 202, the thermal neutron detector 204, and the neutron shield 206 are disposed on the metal plate 110 within the periphery 114.

A rover 102 is envisioned, in another embodiment, to support the He-3 detection arrangement 200, wherein the rover 102 positions the metal plate within 10 cm of a surface 112A of granular soil 112. The He-3 detection arrangement 200 envisions the concentration 220 being influenced by a He-3 concentration in the granular soil 112.

In another embodiment of the He-3 detection arrangement 200, the metal plate 110 is aluminum.

The He-3 detection arrangement 200 can further comprise a wireless communicator 212 and 214 that is configured to communicate the concentration 220 to a receiver, such as a receiver at a remote hub or remote station that is evaluating the concentration 220 at each location sampled (from 152 and 154 to 156, as shown in FIG. 1B). In some embodiments, the concentration 220 can be determined with respect to time.

In another embodiment of the He-3 detection arrangement 200, the metal plate 110 is at least part of a rover base of a rover 102.

The He-3 detection arrangement 200 further envisions the metal plate 110 being located less than 10 cm from a granular surface 112A when the thermal neutron source 202 is emitting the neutrons 222.

The He-3 detection arrangement 200 imagines an embodiment wherein the metal plate 110 comprises handles 224 that are configured to be carried by at least one human or robot.

The He-3 detection arrangement 200 imagines an embodiment wherein the metal plate 110 is attached to a low gravity skipper 120.

Another embodiment of the present invention envisions a He-3 detection system 200 comprising generally comprising a thermal neutron detector 204 sensing a quantity of neutrons 222 emitted from a thermal neutron source 202 to evaluate a concentration of He-3 in regolith 112 or some other granular soil. More specifically, the embodiment envisions the thermal neutron source 220 configured to emit thermal neutrons 222 in all directions wherein the thermal neutron detection system 204 is configured to detect a neutron concentration 220 of the thermal neutrons 222 backscattered from granular soil 112. A neutron shield 206 is interposed between the thermal neutron source 202 and the thermal neutron detector 204 to isolate the neutrons detected from the regolith 112 thereby assessing a quantity or concentration of He-3 in the regolith 112. A power source 210, such as a battery, can be included with the system to provide power to the thermal neutron source 202 and the thermal neutron detection system 204. The neutron shield 206, the thermal neutron source 202, and the thermal neutron detection system 204 are envisioned to be disposed on a metal plate 110 that is configured to be placed within 10 cm of a surface 112A of the granular soil 112.

The He-3 detection system 200 further imagines the neutron shield 206 being configured to block at least 90% of the thermal neutrons 222 emitted from the thermal neutron source 202, the neutrons 222 being aimed along the line-of-sight 218 at the thermal neutron detection system 204.

The He-3 detection system 200 further envisions the neutron concentration 220 that is detected by the thermal neutron detection system 204 being inversely proportional to a concentration of He-3 in the granular soil 112.

The He-3 detection system 200 envisions and embodiment where the neutron shield 206 is a boronated shield.

The He-3 detection system embodiment 200 can further comprise a transmitter 214 that is configured to transmit the neutron concentration 220 to a remote receiver.

The He-3 detection system 200 envisions mapping out a region for He-3 concentration using the He-3 detection system 200 by moving it to different locations (from 152 and 154 to 156, as shown in FIG. 1B) on the surface 112A of a celestial body 122 via transport that is selected from a group consisting of a rover 102, a low gravity skipper 120 or a robot (not shown).

The He-3 detection system 200 envisions the neutron shield 206 being at between 1 and 4 inches thick depending on the desired amount of neutron attenuation on the thermal neutron detection system side of the neutron shield 206.

Yet another embodiment of the present invention envisions an arrangement 200 that detects He-3 in regolith 112 on the Moon 122. The arrangement 220 can comprise a neutron source 202 that is configured to emit thermal neutrons 222, a neutron detector 204 that is configured to detect a neutron concentration 220 of the neutrons 222 that are backscattered 220 from the regolith 112 and a neutron shield 206 that is interposed between the neutron source 202 and the neutron detector 204. The neutron shield 206 is configured to block at least some of the neutrons 222 in a line-of-sight 218 between the neutron source 202 and the neutron detector 204. The arrangement 200 can also include a power source 210 that is configured to provide power to the thermal neutron source 202, the thermal neutron detection system 204, and a transmitter 214. The transmitter 214 is configured to transmit the neutron concentration/s 220 to a remote receive. The neutron shield 206, the thermal neutron source 202, and the thermal neutron detection system 204 are envisioned to be disposed on a metal plate 110. The arrangement 200 is further envisioned to be moved to different locations from 152 and 154 to 156, as shown in FIG. 1B) on the surface 112A of the Moon 122 via a transporter 102 or 120.

This arrangement 200 further envisions the neutron shield 206 being thick enough and comprising enough attenuating material, such as boron, to attenuate at least 95% of the neutrons 222.

In this arrangement 200 the neutron concentration 220 detected by the neutron detector 204 is inversely proportional to a concentration of He-3 in the regolith 112.

These exemplified embodiments are not exhaustive of the embodiments presented throughout the description, but rather are merely one example of a contemplated embodiment chain consistent with embodiments of the present invention. In other words, there are numerous other embodiments described herein that are not necessarily presented in the apparatus embodiment examples presented immediately above.

It is to be understood that even though numerous characteristics and advantages of various embodiments of the present invention have been set forth in the foregoing description, together with the details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended embodiments are expressed. For example, the orientation of the elements and the plate can include other geometries not explicitly shown in the embodiments above while maintaining essentially the same functionality without departing from the scope and spirit of the present invention. Likewise, the materials and construction of the neutron shield can be different but serve the same purpose without departing from the scope and spirit of the present invention. It should further be appreciated that with respect to the mass spectrometer, the basic construction is well known in the art and modification to present embodiments discussed can be made once a skilled artisan is in possession of the concepts disclosed herein. Moreover, the electronics and computing that enable the functionality of the He-3 detection system are not described in detail because they either exist or are easily constructed by those skilled in the art.

It will be clear that the present invention is well adapted to attain the ends and advantages mentioned as well as those inherent therein. While presently preferred embodiments have been described for purposes of this disclosure, numerous changes may be made which readily suggest themselves to those skilled in the art and which are encompassed in the spirit of the invention disclosed.

What is claimed is:

1. A mass spectrometer arrangement comprising:
an intake port;
a detector housing that comprises a detector plate;
an exit port;
a base-particle pathway defined between the intake port and the detector plate, the base-particle pathway traverses through the mass spectrometer arrangement;
an intake funnel comprising a funnel shaped housing that extends from the intake port to the exit port, the exit port is smaller than the intake port, the intake port is unobstructed from directly interfacing an open environment, the intake port is configured to be in communication with the open environment during an operation;
an ionizer adjacent to the exit port, the ionizer configured to ionize base-particles in a portion of the base-particle pathway;
an angled housing comprising split-pole magnets configured to direct the base-particles at an angle $j$+/−an offset along the base-particle pathway; and
a granular surface disrupter configured to liberate the base-particles from a granular surface that is external to the mass spectrometer arrangement.

2. The mass spectrometer arrangement of claim 1, wherein the mass spectrometer arrangement is devoid of a pressure chamber adapted to maintain a pressure that is lower than the open environment.

3. The mass spectrometer arrangement of claim 1, wherein the granular surface disrupter is a heating element.

4. The mass spectrometer arrangement of claim 1, wherein an exit port area of the exit port is at least one-half of an intake port area of the intake port.

5. The mass spectrometer arrangement of claim 1, wherein the base-particles include helium-3, and the mass spectrometer is tuned to helium-3.

6. The mass spectrometer arrangement of claim 1 further comprising a mobile carrier configured to support the mass spectrometer arrangement, the mass spectrometer arrangement is selected from a group consisting of a rover, a dispersion pod, a skipper, or a hand-held carrier.

7. The mass spectrometer arrangement of claim 6, wherein the mobile carrier is configured to position the intake port within 6 inches of the granular surface.

8. The mass spectrometer arrangement of claim 1, further comprising a computer system configured to determine a neutron concentration of helium-3 in a granular soil at a second location and at a first location from neutrons detected via the mass spectrometer arrangement.

9. The mass spectrometer arrangement of claim 8, further comprising a wireless communicator configured to communicate the concentration of helium-3 to a receiver.

10. A mass spectrometer system comprising:
an exit port;
an intake funnel comprising an intake port configured to receive base-particles directly from an open environment, the intake funnel configured to direct the base-particles to the exit port;
a detector;
a channel that extends through the mass spectrometer from the intake port to the detector;
an ionizer configured to ionize the base-particles from the exit port;
an angled housing;
split-pole magnets disposed in the angled housing between the ionizer and the detector;
a heating element configured to liberate the base-particles via heat from a granular surface that is external to the mass spectrometer system; and
a mobile carrier configured to position the intake port in a close proximity to the granular surface.

11. The mass spectrometer system of claim 10, wherein the exit port is smaller than the intake port.

12. The mass spectrometer system of claim 10, wherein the intake port is in communication with the open environment during an operation, mass spectrometer system is devoid of a pressure chamber.

13. The mass spectrometer system of claim 10, further comprising an accelerator between the ionizer and the split-pole magnets.

14. The mass spectrometer system of claim 10, wherein the split-pole magnets are configured to direct the base-particles at an angle $\beta$+/−an offset along the channel.

15. The mass spectrometer system of claim 10, wherein the mass spectrometer system is tuned to determine a concentration of helium-3 in the granular surface at a second location and at a first location.

16. The mass spectrometer system of claim 10, wherein the mobile carrier is selected from a group consisting of a rover, a dispersion pod, a skipper, or a hand-held carrier.

17. An open environmental mass spectrometer arrangement comprising:
a mass spectrometer that has an intake port and an intake funnel configured to receive base-particles through the intake port directly from an open environment, the intake funnel configured to direct the base-particles into the mass spectrometer;
a heating element configured to liberate the base-particles from a regolith via heat, the regolith is not part of the open environmental mass spectrometer arrangement; and
a mobile carrier configured to position the intake port within 12 inches from the regolith.

* * * * *

UNITED STATES PATENT AND TRADEMARK OFFICE
CERTIFICATE OF CORRECTION

| | | |
|---|---|---|
| PATENT NO. | : 12,100,580 B1 | Page 1 of 1 |
| APPLICATION NO. | : 18/406459 | |
| DATED | : September 24, 2024 | |
| INVENTOR(S) | : Chris Salvino and Andrew Dummer | |

It is certified that error appears in the above-identified patent and that said Letters Patent is hereby corrected as shown below:

In the Claims

Claim 1, of Column 17, Line 20 should read: "an angled housing comprising split-pole magnets configured to direct the base-particles at an angle $\beta$ +/- an offset along the base-particle pathway"

Signed and Sealed this
Twenty-ninth Day of April, 2025

Coke Morgan Stewart
*Acting Director of the United States Patent and Trademark Office*